(12) United States Patent
Xiong et al.

(10) Patent No.: US 10,952,186 B2
(45) Date of Patent: Mar. 16, 2021

(54) RESERVED RESOURCE ELEMENTS FOR HYBRID AUTOMATIC REPEAT REQUEST BITS

(71) Applicant: Apple Inc., Cupertino, CA (US)

(72) Inventors: Gang Xiong, Portland, OR (US); Joonyoung Cho, Portland, OR (US); Yushu Zhang, Beijing (CN); Ajit Nimbalker, Fremont, CA (US); Lopamudra Kundu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 16/246,102

(22) Filed: Jan. 11, 2019

(65) Prior Publication Data

US 2019/0166597 A1     May 30, 2019

Related U.S. Application Data

(60) Provisional application No. 62/616,763, filed on Jan. 12, 2018, provisional application No. 62/710,310, filed on Feb. 16, 2018.

(51) Int. Cl.
| | |
|---|---|
| *H04W 56/00* | (2009.01) |
| *H04W 72/04* | (2009.01) |
| *H04L 1/18* | (2006.01) |
| *H04L 5/00* | (2006.01) |

(52) U.S. Cl.
CPC ....... *H04W 72/0413* (2013.01); *H04L 1/1812* (2013.01); *H04L 5/0044* (2013.01); *H04L 5/0048* (2013.01); *H04L 5/0055* (2013.01)

(58) Field of Classification Search
CPC ............. H04W 72/0413; H04L 1/1812; H04L 5/0044; H04L 5/0048; H04L 5/0055
USPC ......................................................... 370/329
See application file for complete search history.

(56) References Cited

U.S. PATENT DOCUMENTS

| | | | |
|---|---|---|---|
| 2012/0099545 A1* | 4/2012 | Han ...................... | H04L 1/0028 370/329 |
| 2017/0366380 A1* | 12/2017 | Hwang ............. | H04W 72/0413 |
| 2018/0006791 A1* | 1/2018 | Marinier ............... | H04L 1/0057 |
| 2018/0026769 A1* | 1/2018 | Lee .......................... | H04L 5/00 370/329 |
| 2018/0212718 A1* | 7/2018 | Takeda .................. | H04W 24/10 |
| 2019/0037586 A1* | 1/2019 | Park ....................... | H04L 1/0057 |
| 2019/0165896 A1* | 5/2019 | Huang ............. | H04W 72/0413 |
| 2019/0199477 A1* | 6/2019 | Park ....................... | H04L 1/0067 |
| 2019/0215823 A1* | 7/2019 | Kim ...................... | H04L 1/1664 |

OTHER PUBLICATIONS

3GPP, "Technical Specification Group Radio Access Network; NR; Multiplexing and channel coding (Release 15)," 3GPP TS 38.212 V15.0.0 (Dec. 2017), 5G, 82 pages.
3GPP, "RAN1 Chairman's Notes," 3GPP TSG RAN WG1 Meeting 91, Nov. 27-Dec. 1, 2017, Reno, USA, 179 pages.

* cited by examiner

*Primary Examiner* — Sai Ming Chan
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for transmitting uplink control information in new radio (NR) applications. Various embodiments describe how to calculate a number of reserved HARQ-ACK resource elements. Other embodiments may be described and claimed.

25 Claims, 16 Drawing Sheets

RESERVED RESOURCE ELEMENTS FOR HYBRID AUTOMATIC REPEAT REQUEST BITS

CROSS REFERENCE TO RELATED APPLICATION

The present application claims priority to U.S. Provisional Patent Application No. 62/616,763, filed Jan. 12, 2018, entitled "System and Methods on Reserved Resource Elements for 1 or 2 Hybrid Automatic Repeat Request Bits," and to U.S. Provisional Patent Application No. 62/710,310, filed Feb. 16, 2018, entitled "Reserved Resource Elements for 1 or 2 Hybrid Automatic Repeat Request Bits," the entire disclosures of which are hereby incorporated by reference in their entireties.

FIELD

Embodiments of the present invention relate generally to the technical field of wireless communications.

BACKGROUND

Mobile communication has evolved significantly from early voice systems to today's highly sophisticated integrated communication platform. The next generation wireless communication system, which may be referred to as 5G or new radio (NR), may provide access to information in sharing of data anywhere, any time by various users and applications. NR is expected to be a unified network/system that meets vastly different and sometimes conflicting performance dimensions and services. Such diverse multi-dimensional requirements may be driven by different services and applications. In general, NR will evolve based on 3$^{rd}$ Generation Partnership Project (3GPP) LTE-Advanced with additional potential new Radio Access Technologies (RATs) to improve wireless connectivity solutions. NR may enable ubiquitous wireless connections the deliver fast and Rich content in services

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

Figure 1:
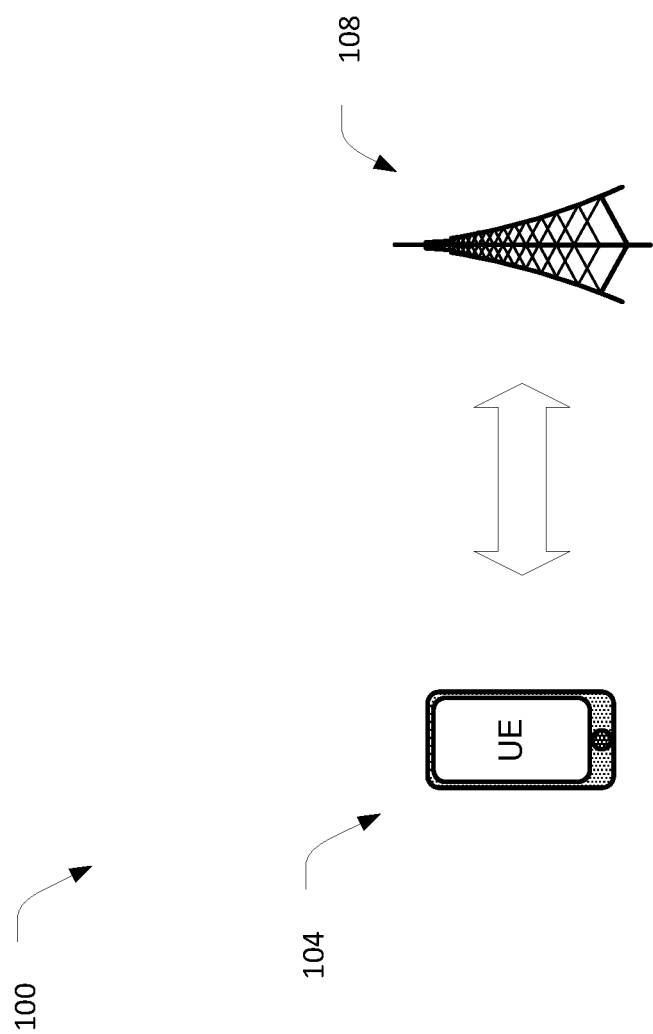
FIG. 1 illustrates a simplified network in accordance with some embodiments.

FIG. 1 illustrates a simplified network 100 in accordance with some embodiments. The network 100 may include a user equipment (UE) 104 communicatively coupled with an access node 108. The UE 104 and access node 108 may correspond to and be substantially interchangeable with like-named elements described with respect to FIGS. 9-16.

The UE 104 may transmit uplink control information (UCI) to the access node 108. For NR, the UCI may include a scheduling request (SR), hybrid automatic repeat request-acknowledgment (HARQ-ACK) feedback, or a channel state information (CSI) report. The CSI report may include, for example, a channel quality indicator (CQI), a pre-coding matrix indicator (PMI), a layer indicator (LI), a CSI resource indicator (CRI), a rank indicator (RI), or beam-related information (for example, layer 1-reference signal received power (L1-RSRP)).

In some embodiments, the UCI may be carried by either a physical uplink shared channel (PUSCH) or a physical uplink control channel (PUCCH). When the UCI is carried on the PUSCH, a CSI report may be composed of up to 2 parts. The first CSI part, also referred to as CSI part 1, may include RI/CRI or CQI for a first codeword (CW). The second CSI part, also referred to as CSI part 2, may include LI, PMI, or CQI for the second codeword when RI is greater than four. The payload size for the first CSI part may be predetermined, with potential zero padding that may depend on a specific configuration. A payload size for the second CSI part may be variable and may be derived based on content of the first CSI part.

For HARQ-ACK feedback on the PUSCH and for slot-based scheduling, the PUSCH may be rate matched for HARQ-ACK having more than two bits or punctured for HARQ-ACK up to two bits. Furthermore, if the HARQ-ACK has one or two bits and the CSI part 1 is present on the PUSCH, the reserved resource elements (REs) for HARQ-ACK may be defined to avoid puncturing of the CSI part 1 by the HARQ-ACK in order to ensure robust decoding performance for the CSI part 1. In particular, in this case, the CSI part 1 may be rate matched around the reserved HARQ-ACK.

Embodiments of the present disclosure provide details of reserved REs (for example, pattern, mapping, and number of the REs) for HARQ-ACK for UCI on the PUSCH. In particular, some embodiments describe reserved RE mapping patterns and calculation of a number of reserved REs, and associated parameters, in case of a certain number of HARQ-ACK bits, for example, one or two HARQ-ACK bits.

Reserved RE Mapping Pattern

The UCI mapping in frequency domain may be as follows. For a given UCI type, on an i-th orthogonal frequency division multiplexing (OFDM) symbol, modulated UCI symbols may be mapped to REs in a distributed manner with a distance, d, determined as follows: d=1 if a number of unmapped modulated symbols for that UCI at a beginning of OFDM symbol i is larger or equal to a number of available REs in this OFDM symbol; and d=floor (number of available REs on i-th OFDM symbol/number of unmapped modulated symbols for that UCI at a beginning of OFDM symbol i).

Instead of a floor function, other functions (for example, ceiling, rounding, etc.) may be additionally/alternatively applied as those may also provide distributed mapping. While embodiments may be described by using a floor function for illustration and brevity, it is noted that the other approximation functions (e.g. ceiling, rounding, etc.) may also be applied.

In the case of 1 or 2 or limited number of HARQ-ACK bits on the PUSCH, reserved HARQ-ACK REs may be defined to avoid puncturing of CSI part 1 (or some other information transmitted on the PUSCH, for example, data or other UCI) by HARQ-ACK bits. Some embodiments of reserved HARQ-ACK RE mapping pattern may include the following.

In embodiments, the same or similar mapping rule defined for UCI on the PUSCH may be employed for reserved HARQ-ACK RE mapping, for example, regarding the amount and the location of the reserved REs. In particular, reserved HARQ-ACK REs can be mapped starting from the first non-demodulation reference signal (DM-RS) symbols (for example, symbols that do not carry a DM-RS) after the first DM-RS symbol(s) (for example, the symbol(s) that do carry a DM-RS). Further, the distance between reserved HARQ-ACK REs may be one if a number of HARQ-ACK reserved REs is equal to or larger than a number of available REs in the symbol. If the number of HARQ-ACK reserved REs is less than a number of available REs in the symbol, the distance can be a floor(number of available REs/number of remaining REs for reserved HARQ-ACK).

Figure 2:
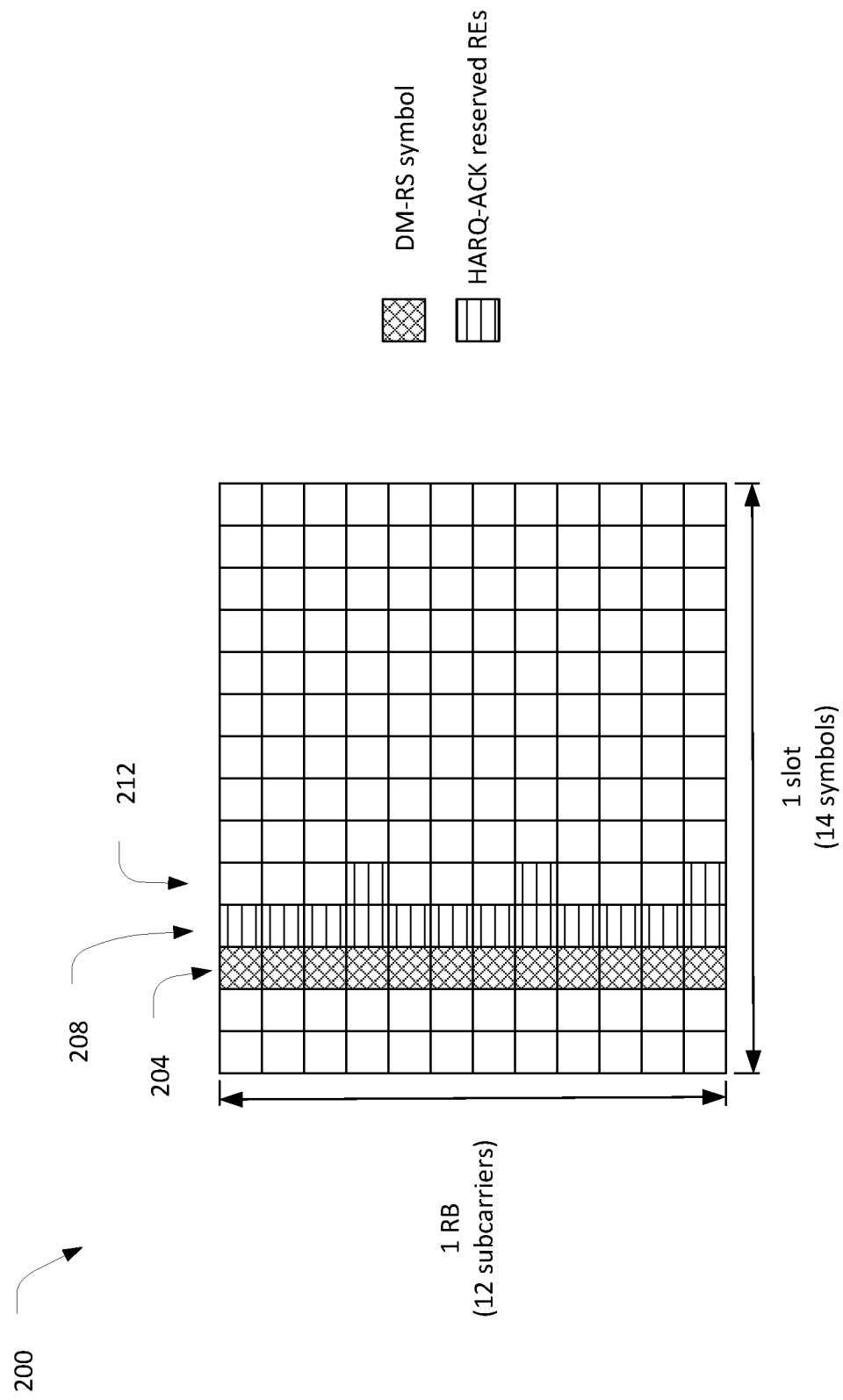
FIG. 2 illustrates a physical resource block exhibiting a reserved HARQ-ACK resource element mapping pattern in accordance with some embodiments.

FIG. 2 illustrates a physical resource block (PRB) 200 exhibiting a reserved HARQ-ACK RE mapping pattern in accordance with some embodiments. The PRB 200 may include one resource block (RB) (12 subcarriers) and one slot (14 symbols). Thus, 168 resource elements are shown in the PRB 200. In this example, the third symbol 204 (which may also be referred to as symbol #2, as the first symbol may be symbol #0) may carry a DM-RS and may, therefore, be referred to as a DM-RS symbol 204. The reserved HARQ-ACK REs may be mapped starting from the fourth symbol 208 (which may be referred to as symbol #3) right after the first DM-RS symbol 204. In the fifth symbol 212 (which may be referred to as symbol #4), distributed mapping may be employed where remaining reserved REs are equally spread across the subcarriers of the PRB 200.

In some embodiments, the reserved HARQ-ACK REs may be mapped based on the following mapping algorithm:

Set $m_{count}^{ACK}(1) = 0$;
Set $m_{count}^{ACK}(2) = 0$;
for i = 0 to $N_{hop}^{PUSCH} - 1$ \\ $N_{hop}^{PUSCH}$: the number of hops
l = $l^{(i)}$;
while $m_{count}^{ACK}(i) < G^{ACK}(i)$
if $G^{ACK}(i) - m_{count}^{ACK}(i) \geq \overline{M_{sc}^{\Phi}}(l) \cdot N_L \cdot Q_m$
  d = 1;
  $m_{count}^{RE} = \overline{M_{sc}^{\Phi}}(l)$;
end if
if $G^{ACK}(i) - m_{count}^{ACK}(i) < \overline{M_{sc}^{\Phi}}(l) \cdot N_L \cdot Q_m$
  d = $\lfloor \overline{M_{sc}^{\Phi}}(l) \cdot N_L \cdot Q_m / (G^{ACK}(i) - m_{count}^{ACK}(i)) \rfloor$;
  $m_{count}^{RE} = \lceil (G^{ACK}(i) - m_{count}^{ACK}(i))/(N_L \cdot Q_m) \rceil$;
end if
for j = 0 to $m_{count}^{RE} - 1$
  $\overline{\Phi}_j^{rvd} = \overline{\Phi}_l(j \cdot d)$;
  for v = 0 to $N_L \cdot Q_m - 1$
    $m_{count}^{ACK}(i) = m_{count}^{ACK}(i)+1$;
  end for
end for
  end while
end for where $m_{count}^{ACK}(1)$ is a number of counted HARQ-ACK bits in a first hop, $m_{count}^{ACK}(2)$ is a number of counted HARQ-ACK bits in a second hop, $G^{ACK}(i)$ is a number of coded bits for HARQ-ACK, l is an OFDM symbol index, $\overline{\Phi}_l^{rvd}$ is a set of reserved resource elements for potential HARQ-ACK transmission in OFDM symbol l, $N_{hop}^{PUSCH}$ is a number of hops, $Q_m$ is a modulation order of the PUSCH, $N_L$ is a number of transmission layers of the PUSCH, $\overline{M}_{sc}^{\Phi}$ is a number of available REs for UCE in each symbol, $m_{count}^{RE}$ is a number of counted REs in each symbol, and d is a spacing between reserved HARQ-ACK REs.

The first portion of the if expression, $G^{ACK}(i)-m_{count}^{ACK}(i)$, indicates a number of reserved HARQ-ACK REs in symbol i, while the second portion of the if expression, $\overline{M}_{sc}^{\Phi}(l)*N_L*Q_m$, indicates a number of available REs in the symbol. If the first portion is larger than or equal to the second portion, then the spacing between the reserved HARQ-ACK REs, d, is set to one. If the first portion is less than the second portion, then the spacing between the reserved HARQ-ACK REs, d, is set based on a floor function such as $\lfloor \overline{M}_{sc}^{\Phi}(l)*N_L*Q_m/(G^{ACK}(i)-m_{count}^{ACK}(i)) \rfloor$. Again, in various embodiments other floor functions or other approximation functions may be used.

The above mapping function may be applied to the case when frequency hopping (more than 1 hop) or frequency non-hopping case (1 hop) for PUSCH transmissions.

In some embodiments, K symbols can be reserved for HARQ-ACK. Symbols, as used herein, could include, for example, OFDM symbols or discrete Fourier transform spread orthogonal frequency division multiplexing (DFT-SOFDM) symbols. K can be determined based on the number of reserved REs and/or beta offset for HARQ-ACK feedback and/or the amount of allocated resource, for example, in frequency, for PUSCH transmission. For example, in case when the number of reserved REs is less than a threshold X1 and/or the amount of the allocated resource is larger than a threshold Y1, K=1. In case when the number of reserved REs is greater than the threshold X1 and/or the allocated resource for PUSCH is less than the threshold Y1, K=2. The thresholds may be predefined or configured, dynamically or statically, in various embodiments.

Figure 3:
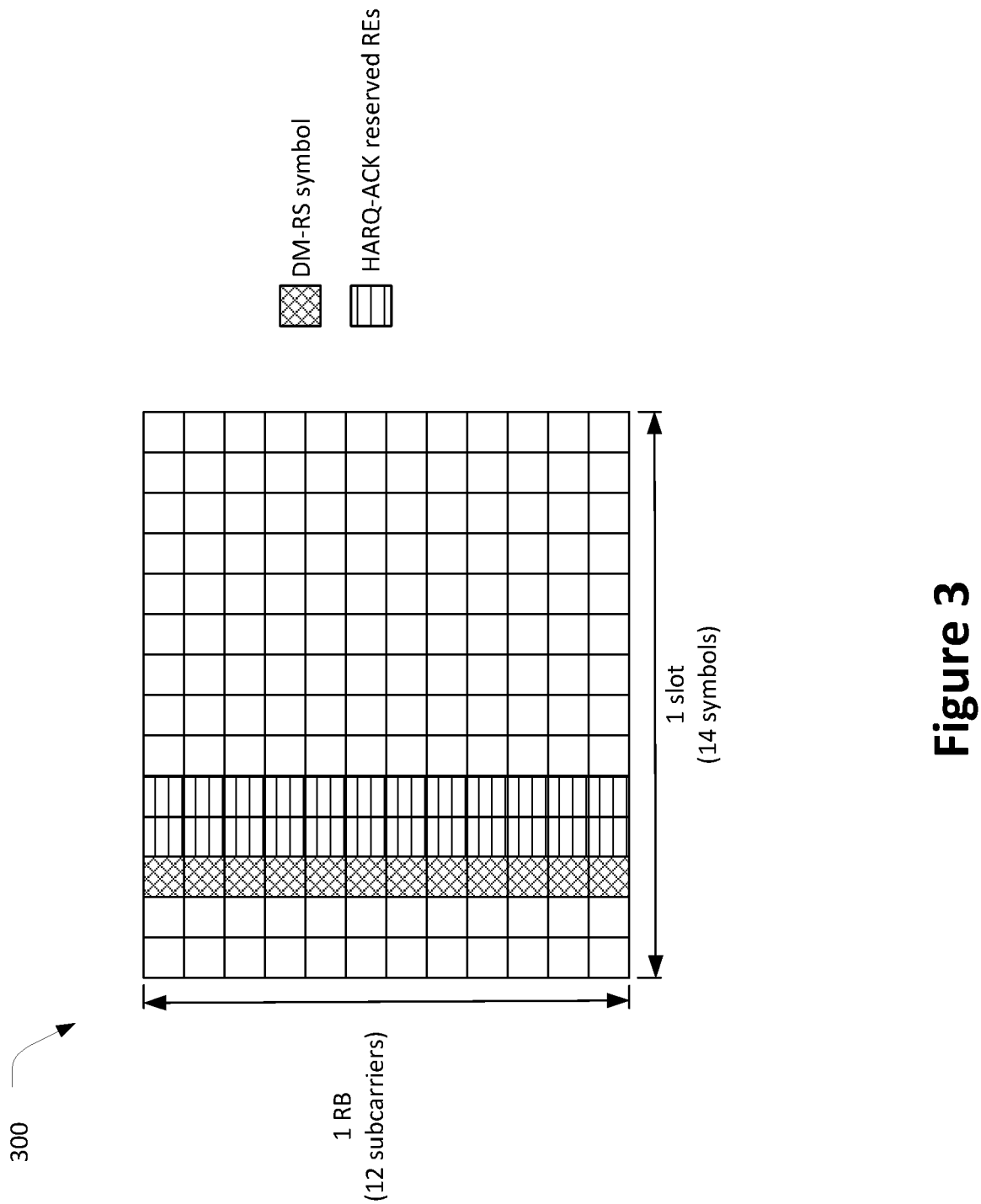
FIG. 3 illustrates a physical resource block exhibiting another reserved HARQ-ACK resource element mapping pattern in accordance with some embodiments.

In this embodiment, the reserved HARQ-ACK REs can be mapped starting from the first non-DM-RS symbols after the first DM-RS symbol(s), similar to the mapping shown above with respect to FIG. 2. FIG. 3 illustrates a PRB 300 exhibiting another reserved HARQ-ACK RE mapping pattern in accordance with some embodiments. In this example, two symbols 304 and 308 are reserved for HARQ-ACK in case of one or two HARQ-ACK bits.

In some embodiments, if other reference signals are present, for example, a phase-tracking reference signal (PT-RS), when HARQ-ACK and/or CSI occupies more than 1 symbol, the time domain pattern for the other reference signal (for example, PT-RS) may be fixed to be every symbol or predetermined, for example, the time-domain pattern may be independent of, or regardless of, the scheduling modulation and coding scheme (MCS).

Calculation of the Number of Reserved REs in Case of 1 or 2 HARQ-ACK Bits

Embodiments of calculation of the number of reserved resource elements in case of 1 or 2 HARQ-ACK bits are provided as follows. The same principle can also be applied for calculating number of reserved REs in situations having larger number of HARQ-ACK bits or for reserving REs for other UCI types.

In some embodiments, the number of reserved HARQ-ACK REs can be calculated based on a metric or parameter of an uplink transmission assuming a particular HARQ-ACK payload size. The metric may be, for example, a modulation and coding scheme (MCS), spectrum efficiency, payload size, etc. The uplink transmission may be, for example, an uplink-shared channel (UL-SCH) transmission or other transmission on PUSCH (for example, UCI transmission). In some embodiments, the number of reserved HARQ-ACK resource elements may additionally or alternatively be calculated based on a beta offset or a relative beta offset.

The particular HARQ-ACK payload size used to calculate the number of reserved HARQ-ACK resource elements may be fixed, for example, according to a technical specification. In various embodiments, the fixed HARQ-ACK payload size may be one or two. In another embodiment, the particular HARQ-ACK payload size may be indicated to a user equipment through, for example, configuration information transmitted to the UE 104 from the access node 108.

Calculating the number of reserved HARQ-ACK resource elements as described above may apply for the case when HARQ-ACK and CSI are present on PUSCH with UL-SCH data.

In some embodiments, the number of reserved HARQ-ACK REs can be calculated based on a metric of CSI part 1 or reference CSI part 2 assuming a particular HARQ-ACK payload size. The metric may be an MCS, spectrum efficiency, CSI payload size, etc. In some of these embodiments, the number of reserved HARQ-ACK resource elements may additionally or alternatively be calculated based on a relative beta offset. Similar to the embodiments described above, the particular HARQ-ACK payload size may be fixed (and may be, for example, one or two) or indicated.

Calculating the number of reserved HARQ-ACK resource elements in this manner may apply for the case when HARQ-ACK and CSI are present on PUSCH without UL-SCH data.

In some embodiments, such as those described above, a scaling factor or an offset can be applied on the calculation of the number of reserved HARQ-ACK REs. The scaling factor can be a predefined number, for example, 0.8 or 0.75, or configured by higher layers. When configured by higher layers, the access node 108 may provide, to the UE 104, an indication of the scaling factor in configuration information. This may be transmitted at the radio resource control (RRC) level in some embodiments.

When HARQ-ACK and CSI part 1 are present for transmission on the PUSCH without UL-SCH, and the number of reserved HARQ-ACK REs is greater than actually transmitted HARQ-ACK REs (given the fact that CSI part 1 is rate-matched around the reserved HARQ-ACK REs), some of the resource within the reserved HARQ-ACK REs may be unoccupied. This may be not desirable in terms of spectrum efficiency and power variance.

To address this issue, various embodiments describe how the resource that would otherwise be unoccupied may be allocated for transmission of uplink control information such as, for example, HARQ-ACK or CSI part 1. More specifically, in accordance with some embodiments, a first part of modulated symbols for HARQ-ACK or CSI part 1 can be copied and mapped on to the otherwise unoccupied REs within the reserved HARQ-ACK REs region. The size of the first part of the modulated symbols for HARQ-ACK or CSI part 1 can be equal to the size of otherwise unoccupied REs.

Figure 4:
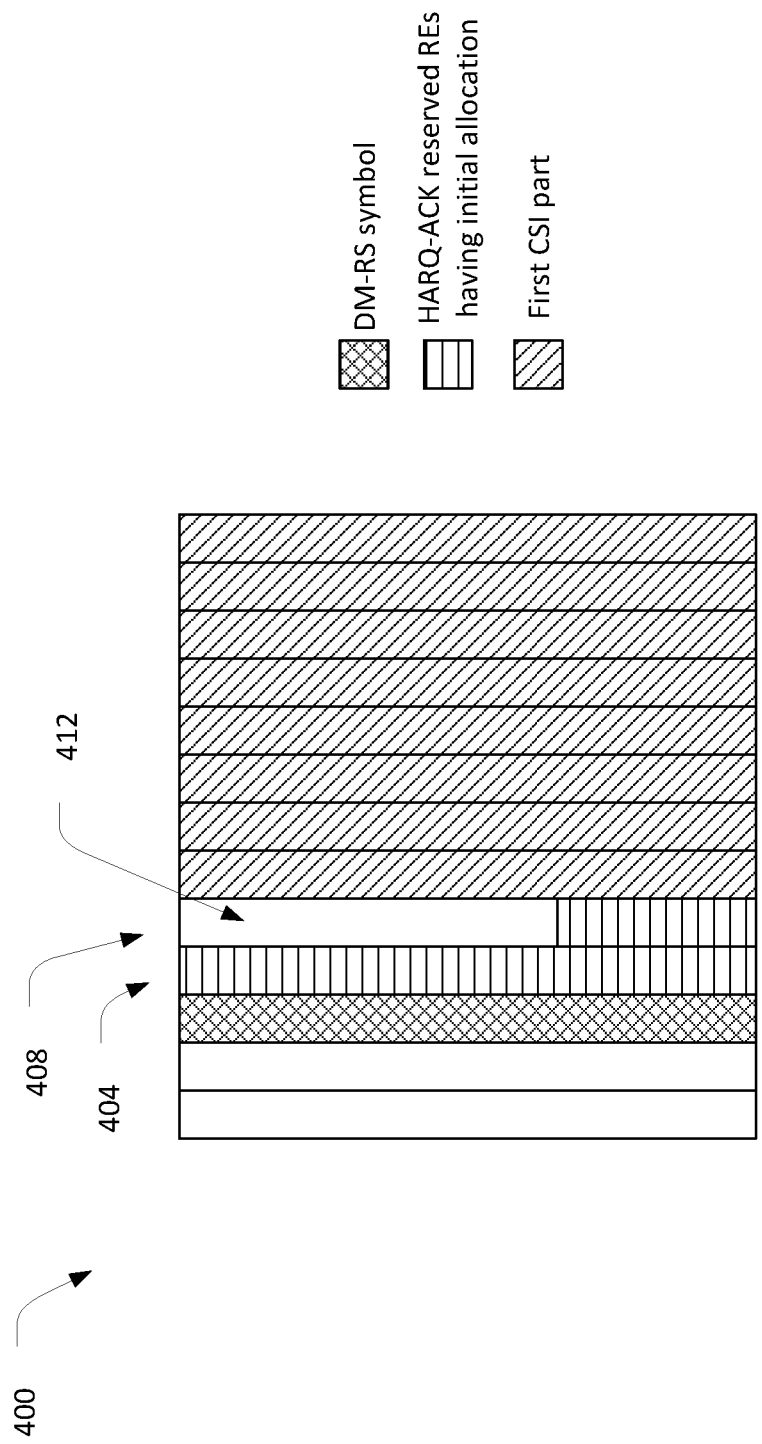
FIG. 4 illustrates a physical resource block exhibiting another reserved HARQ-ACK resource element mapping pattern in accordance with some embodiments.

FIG. 4 illustrates a PRB 400 exhibiting another reserved HARQ-ACK RE mapping pattern in accordance with some embodiments. In this embodiment, the reserved HARQ-ACK resource elements include the fourth and fifth symbols. All of the reserved HARQ-ACK resource elements of the fourth symbol 404 may include an initial allocation of HARQ-ACK bits, while only the bottom subcarriers of the fifth symbol 408 may include reserved HARQ-ACK resource elements having an initial allocation of HARQ-ACK bits. The portion 412, which may include the upper subcarriers of the fifth symbol 408, may not be needed to transmit HARQ-ACK bits and would, therefore, otherwise be unoccupied. This may be the case when HARQ-ACK and CSI part 1 are on PUSCH without UL-SCH and a size of the reserved HARQ-ACK resource elements is larger than needed to transmit the HARQ-ACK bits. In some embodiments, the otherwise unoccupied resource elements of a portion 412 may be allocated for additional HARQ-ACK or CSI part 1 transmission. For example, the additional HARQ-ACK may be a repetition of existing HARQ-ACK bits or zero padding HARQ-ACK to make a total number of HARQ-ACK bits=2 bits.

In some embodiments, a certain portion of CSI part 1 may be repeated and transmitted on the otherwise unoccupied REs within the reserved REs. The UE 104 may first determine a size of the otherwise unallocated REs and the corresponding number of bits that can be used for CSI part 1 transmission based on the number of layers and modulation order. Assuming the calculated number of bits for repeated CSI part 1 transmission as K, then coded bits $g_{k_0}^{CSI\text{-}part1}, g_{k_0+1}^{CSI\text{-}part1}, g_{k_0+2}^{CSI\text{-}part1}, \ldots, g_{k_0+K-1}^{CSI\text{-}part1}$ transmitted on the otherwise unallocated REs in the reserved REs, where $k_0$ is a starting position for repeated CSI part 1 transmission. For instance, $k_0=0$.

In some embodiments, a pseudo random (PN) sequence can be generated and mapped on the otherwise unoccupied resource elements within the reserved REs. The length of the PN sequence can be determined on the size of otherwise unoccupied resource elements within the reserved REs, the modulation order for CSI transmission, or the number of layers for PUSCH transmission.

In various embodiments, the initialization of the PN sequence can be generated based on a function of one or more following parameters: symbol/slot/frame index, configurable ID (for example, scrambling ID used for the corresponding PUSCH transmission), UE identity (for example, cell radio network temporary identifier (C-RNTI)).

Figure 5:
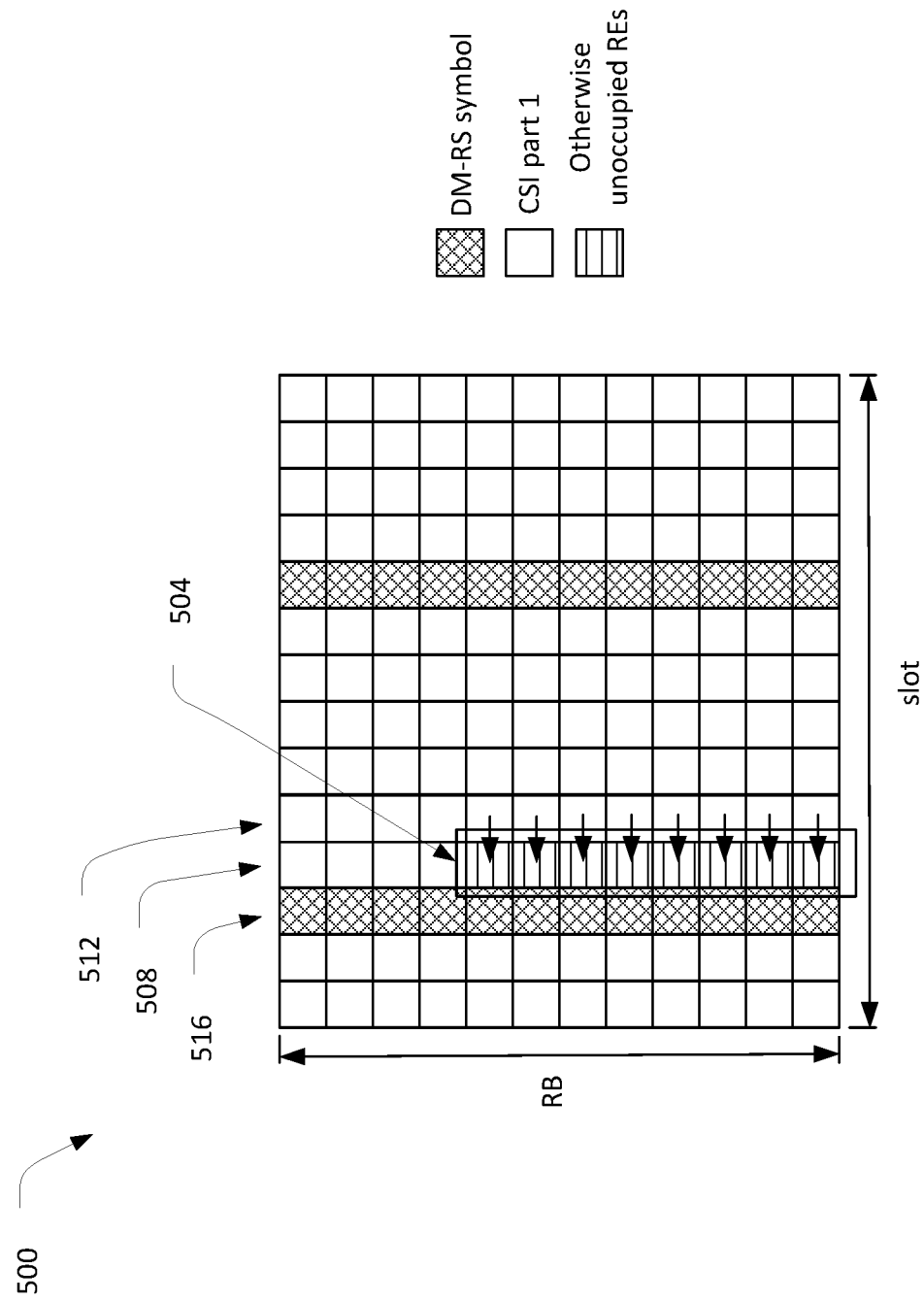
FIG. 5 illustrates a physical resource block demonstrating repetition of modulated symbols in accordance with some embodiments.

In some embodiments, the modulated symbols in first available used REs in the same subcarrier before or after the symbols where otherwise unoccupied resource elements are located can be copied and repeated in the un-used REs. FIG. 5 illustrates a PRB 500 demonstrating the repetition of modulated symbols in otherwise unoccupied resource elements in accordance with some embodiments. As used herein, a modulated symbol may correspond to a portion of an OFDM symbol that corresponds to one resource element.

PRB 500 may include eight reserved resource elements 504 in the fourth symbol 508 (for example, OFDM symbol #3). However, no HARQ-ACK feedback bits may need to be transmitted on the PUSCH in PRB 500. Some of the modulated symbols of the fifth OFDM symbol 512 (for example, OFDM symbol #4), which are CSI part 1 bits, may be repeated and copied to the otherwise unoccupied resource elements of the fourth symbol 508 in respective subcarriers. Alternatively, it may be possible to repeat and map the modulated symbols from respective subcarriers of a second symbol 516 to the otherwise unoccupied resource elements of the fourth symbol 508.

Figure 6:
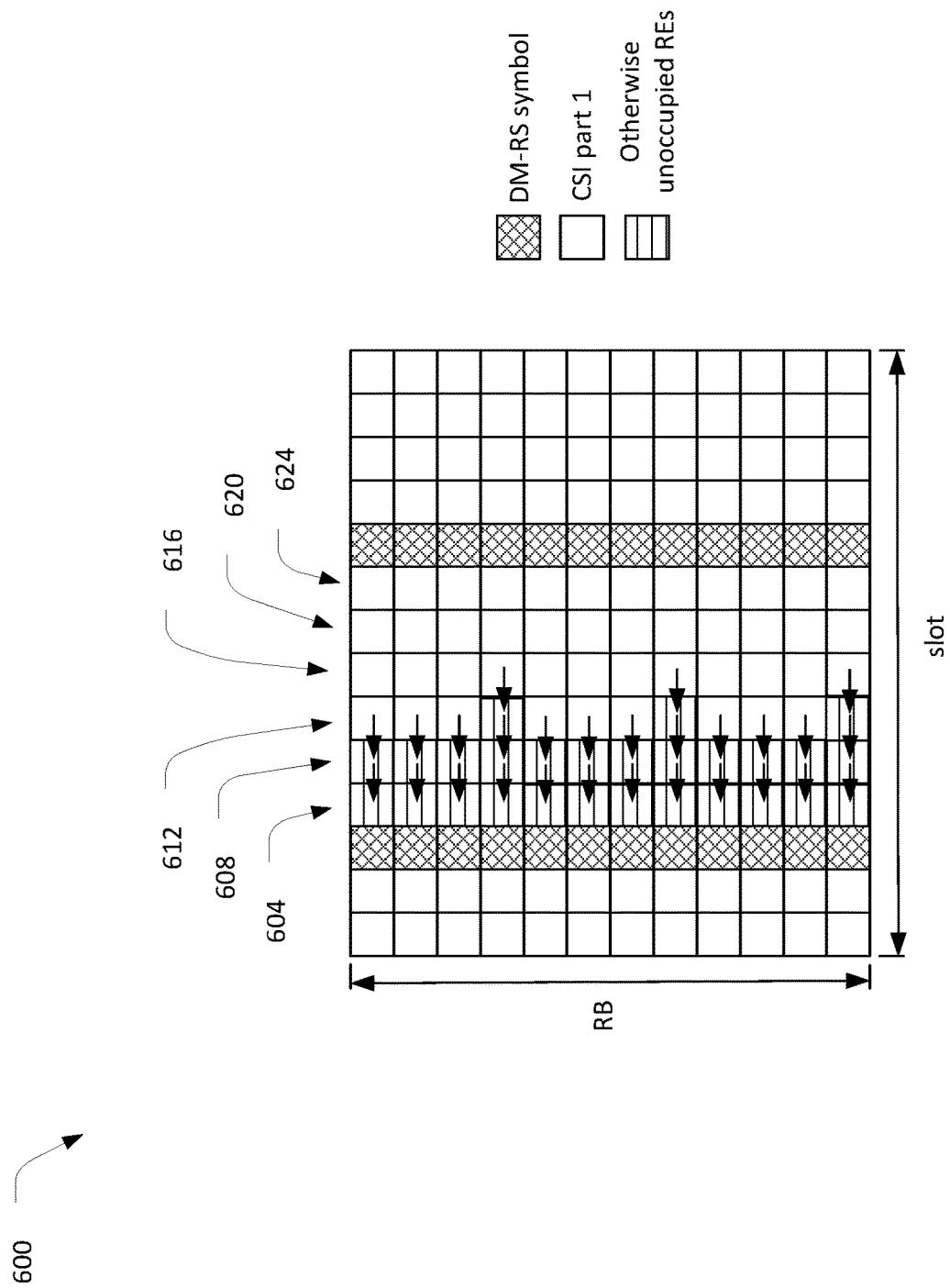
FIG. 6 illustrates a physical resource block demonstrating another repetition of modulated symbols in accordance with some embodiments.

FIG. 6 illustrates a PRB 600 demonstrating the repetition of modulated symbols in otherwise unoccupied resource elements in accordance with some embodiments. The reserved HARQ-ACK resource elements of PRB 600 may include all the resource elements of a fourth symbol 604 (for example, OFDM symbol #3), all the resource elements of a fifth symbol 608 (for example, OFDM symbol #4), and some of the resource elements (for example, subcarriers #0, 4, and 8) of a sixth symbol 612 (for example, OFDM symbol #5). Counting of the subcarrier indices starts from subcarrier #0 at the bottom of the PRB 600.

In this example, for the subcarriers having three reserved resource elements (for example, subcarriers #0, 4, and 8, the modulated symbols of a seventh symbol 616 (for example, OFDM symbol #6), eighth symbol 620 (for example, OFDM symbol #7), and ninth symbol 624 (for example, OFDM symbol #8) may be copied and mapped onto the otherwise unoccupied resource elements of the fourth symbol 604, fifth symbol 608, and sixth symbol 612, respectively. For the subcarriers having two reserved resource elements (for example, subcarriers #1, 2, 3, 5, 6, 7, 9, 10, and 11), the modulated symbols of the seventh symbol 616 and the eighth symbol 620 may be copied and mapped onto the otherwise unoccupied resource elements of the fourth symbol 604 and fifth symbol 608, respectively.

In some embodiments, if a number of reserved REs for HARQ-ACK and/or CSI exceed a threshold, the UE may expect that the UL-SCH shall not be scheduled, where the threshold can be fixed for slot based and non-slot based transmission or be determined by the number of REs used for PUSCH.

Figure 7:
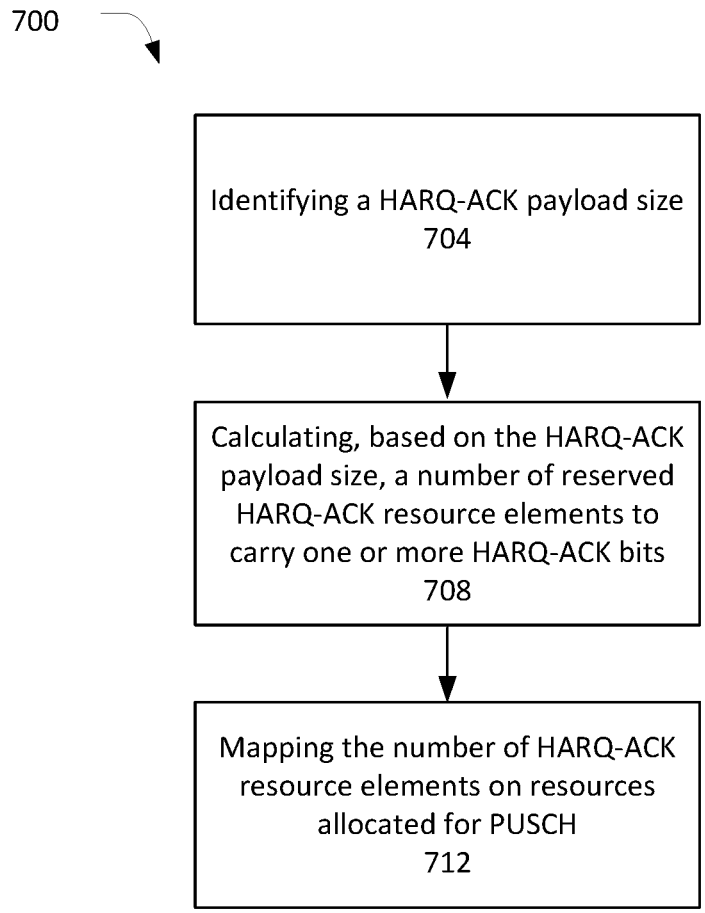
FIG. 7 illustrates an operation flow/algorithmic structure for a UE to transmit uplink control information in accordance with some embodiments.

FIG. 7 illustrates operation flow/algorithmic structure 700 for transmitting uplink control information in accordance with some embodiments.

At block 704, the operation flow/algorithmic structure 700 may include identifying a HARQ-ACK payload size. As described above, the HARQ-ACK payload size may be fixed, for example, preconfigured by a technical specification, or may be indicated to the UE 104 by the access node 108 providing configuration information through, for example, higher-layer signaling such as RRC signaling.

At 708, the operation flow/algorithmic structure 700 may include calculating, based on the HARQ-ACK payload size, a number of reserved HARQ-ACK resource elements to carry one or more HARQ-ACK bits. The one or more HARQ-ACK bits that are to be actually transmitted may be less than the HARQ-ACK payload size assumed at 704.

In some embodiments, the calculating of the number of reserved HARQ-ACK resource elements may be based on a scaling factor. The scaling factor may be fixed, for example, by a technical specification, or it may be indicated to the UE by an access node through, for example, configuration information. In some embodiments, the scaling factor may be less than one. In other embodiments, the scaling factor may be one or greater than one.

In some embodiments, the calculation of the number of reserved HARQ-ACK resource elements may be based on a modulation and coding scheme or spectrum efficiency of an uplink shared channel transmission and a beta offset.

In some embodiments, after calculating or otherwise determining a number of reserved HARQ-ACK resource elements, the UE may encode the HARQ-ACK bits into modulated symbols of respective reserved HARQ-ACK resource elements.

At 712, the operation flow/algorithmic structure 700 may include mapping the number of HARQ-ACK resource elements on resources allocated for PUSCH.

In some embodiments, the UE 104 may map the reserved HARQ-ACK resource elements on a symbol that immediately follows a symbol that carries a DM-RS. In some embodiments, the UE 104 may map the reserved HARQ-ACK resource elements onto more than one symbol, starting with the symbol that immediately follows the first DM-RS symbol. In some embodiments, the UE 104 may map the reserved HARQ-ACK resource elements onto one or more full symbols and one or more partial symbols.

Figure 8:
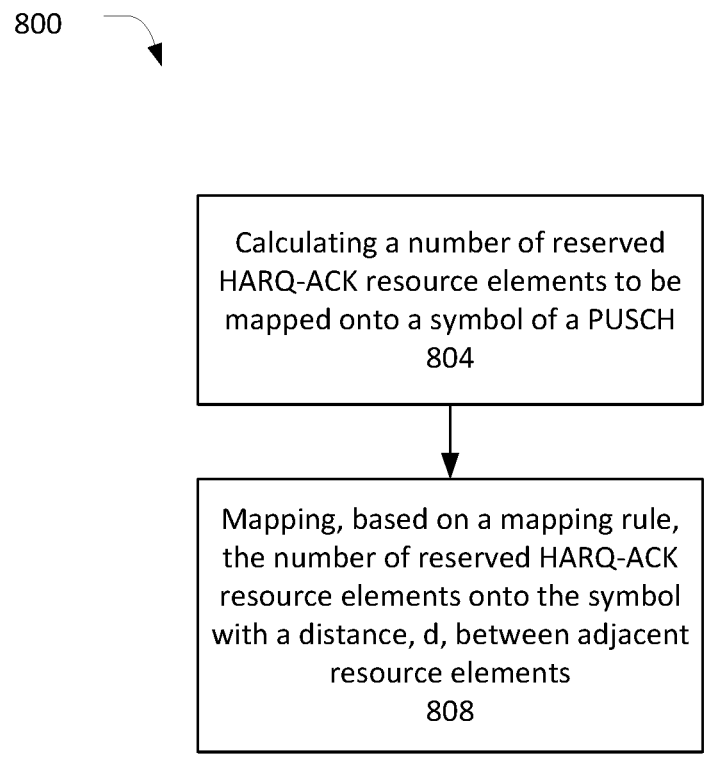
FIG. 8 illustrates an operation flow/algorithmic structure for a UE to transmit uplink control information in accordance with some embodiments.

In some embodiments, the UE may determine a number of symbols that are to be reserved for HARQ-ACK transmissions. This may be based on a number of reserved HARQ-ACK resource elements and the resources allocated for PUSCH transmissions. In some embodiments, the number of symbols that are reserved for HARQ-ACK transmissions may be an integer, K. However, in other embodiments one or more full symbols may be reserved for HARQ-ACK transmissions in conjunction with one or more partial symbols FIG. 8 illustrates an operation flow/algorithmic structure 800 for transmitting uplink control information in accordance with some embodiments.

At block 804, the operation flow/algorithmic structure 800 may include calculating a number of reserved HARQ-ACK resource elements to be mapped onto a symbol of a PUSCH.

At block 808, the operation flow/algorithmic structure 800 may include mapping, based on a mapping rule, the number of reserved HARQ-ACK resource elements onto the symbol. The mapping of the reserved HARQ-ACK resource elements onto the symbol may be done with a distance, d, between adjacent resource elements.

In some embodiments, d may be set to one if a number of reserved HARQ-ACK resource elements is equal to or larger than a number of available resource elements in the symbol. If the number of reserved HARQ-ACK resource elements is less than the number of available resource elements in the symbol, d may be determined using a floor function based on a ratio of the number of available resource elements in the symbol to the number of remaining reserved HARQ-ACK resource elements to be mapped. The floor function may be similar to that described above in conjunction with the mapping algorithm. In various embodiments, other floor functions or other approximation functions may be used.

Figure 9:
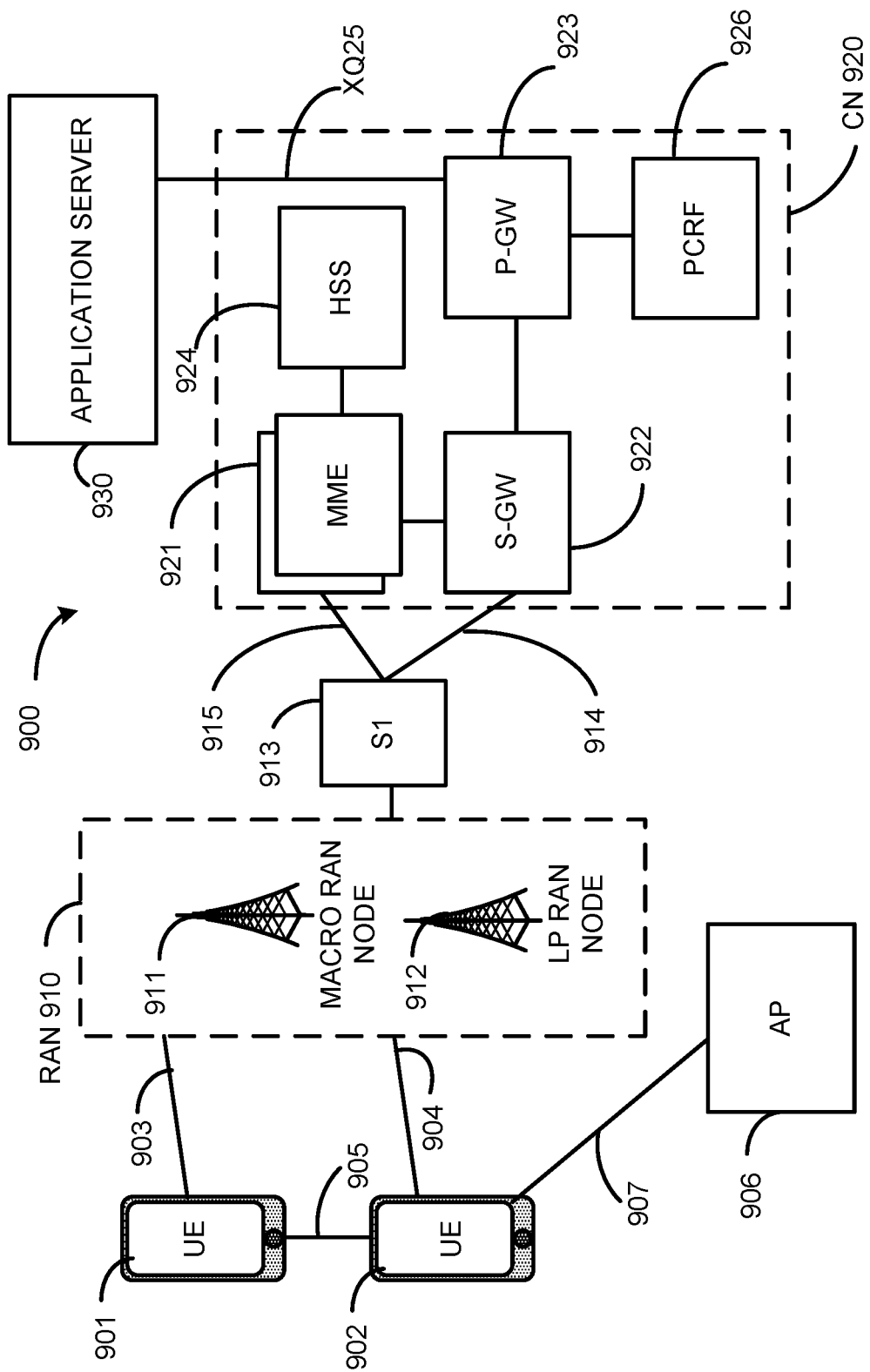
FIG. 9 illustrates an architecture of a system of a network in accordance with some embodiments.

FIG. 9 illustrates an architecture of a system 900 of a network in accordance with some embodiments. The system 900 is shown to include a user equipment (UE) 901 and a UE 902. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 901 and 902 are illustrated as smartphones (e.g., handheld touch-screen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 901 and 902 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 and 902 may be configured to connect, e.g., communicatively couple, with a radio access network (RAN) 910—the RAN 910 may be, for example, an Evolved Universal Mobile Telecommunications System (UMTS) Terrestrial Radio Access Network (E-UTRAN), a NextGen RAN (NG RAN), or some other type of RAN. The UEs 901 and 902 utilize connections (or channels) 903 and 904, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 903 and 904 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 901 and 902 may further directly exchange communication data via a ProSe interface 905. The ProSe interface 905 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 905 may be used in vehicular applications and communications technologies, which are often referred to as V2X systems. V2X is a mode of communication where UEs (for example, UEs 901, 902) communicate with each other directly over the PC5/SL interface 105 and can take place when the UEs 901, 902 are served by RAN nodes 911, 912 or when one or more UEs are outside a coverage area of the RAN 910. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vUEs 901, 902, RAN nodes 911, 912, application servers 930, and pedestrian UEs 901, 902 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 901, 902 may be implemented/employed as Vehicle Embedded Communications Systems (VECS) or vUEs.

The UE 902 is shown to be configured to access an access point (AP) 906 (also referred to as also referred to as "WLAN node 906", "WLAN 906", "WLAN Termination 906" or "WT 906" or the like) via connection 907. The connection 907 can comprise a local wireless connection, such as a connection consistent with any IEEE 802.11 protocol, wherein the AP 906 would comprise a wireless fidelity (WiFi®) router. In this example, the AP 906 is shown to be connected to the Internet without connecting to the core network of the wireless system (described in further detail below). In various embodiments, the UE 902, RAN 910, and AP 906 may be configured to utilize LTE-WLAN aggregation (LWA) operation and/or WLAN LTE/WLAN Radio Level Integration with IPsec Tunnel (LWIP) operation. The LWA operation may involve the UE 902 in RRC_CONNECTED being configured by a RAN node 911, 912 to utilize radio resources of LTE and WLAN. LWIP operation may involve the UE 902 using WLAN radio resources (e.g., connection 907) via Internet Protocol Security (IPsec) protocol tunneling to authenticate and encrypt packets (e.g., internet protocol (IP) packets) sent over the connection 907. IPsec tunneling may include encapsulating entirety of original IP packets and adding a new packet header thereby protecting the original header of the IP packets.

The RAN 910 can include one or more access nodes that enable the connections 903 and 904. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 910 may include one or more RAN nodes for providing macrocells, e.g., macro RAN node 911, and one or more RAN nodes for providing femtocells or picocells (e.g., cells having smaller coverage areas, smaller user capacity, or higher bandwidth compared to macrocells), e.g., low power (LP) RAN node 912.

Any of the RAN nodes 911 and 912 can terminate the air interface protocol and can be the first point of contact for the UEs 901 and 902. In some embodiments, any of the RAN nodes 911 and 912 can fulfill various logical functions for the RAN 910 including, but not limited to, radio network controller (RNC) functions such as radio bearer management, uplink and downlink dynamic radio resource management and data packet scheduling, and mobility management.

In accordance with some embodiments, the UEs 901 and 902 can be configured to communicate using Orthogonal Frequency-Division Multiplexing (OFDM) communication signals with each other or with any of the RAN nodes 911 and 912 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 911 and 912 to the UEs 901 and 902, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 901 and 902. The physical downlink control channel (PDCCH) may carry information about the transport format and resource allocations related to the PDSCH channel, among other things. It may also inform the UEs 901 and 902 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 911 and 912 based on channel quality information fed back from any of the UEs 901 and 902. The downlink resource assignment information may be sent on the PDCCH used for (e.g., assigned to) each of the UEs 901 and 902.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 910 is shown to be communicatively coupled to a core network (CN) 920—via an S1 interface 913. In embodiments, the CN 920 may be an evolved packet core (EPC) network, a NextGen Packet Core (NPC) network, or some other type of CN. In this embodiment the S1 interface 913 is split into two parts: the S1-U interface 914, which carries traffic data between the RAN nodes 911 and 912 and the serving gateway (S-GW) 922, and the S1-mobility management entity (MME) interface 915, which is a signaling interface between the RAN nodes 911 and 912 and MMES 921.

In this embodiment, the CN 920 comprises the MMES 921, the S-GW 922, the Packet Data Network (PDN) Gateway (P-GW) 923, and a home subscriber server (HSS) 924. The MMES 921 may be similar in function to the control plane of legacy Serving General Packet Radio Service (GPRS) Support Nodes (SGSN). The MMES 921 may manage mobility aspects in access such as gateway selection and tracking area list management. The HSS 924 may comprise a database for network users, including subscription-related information to support the network entities' handling of communication sessions. The CN 920 may comprise one or several HSSs 924, depending on the number of mobile subscribers, on the capacity of the equipment, on the organization of the network, etc. For example, the HSS 924 can provide support for routing/roaming, authentication, authorization, naming/addressing resolution, location dependencies, etc.

The S-GW 922 may terminate the S1 interface 913 towards the RAN 910, and routes data packets between the RAN 910 and the CN 920. In addition, the S-GW 922 may be a local mobility anchor point for inter-RAN node handovers and also may provide an anchor for inter-3GPP mobility. Other responsibilities may include lawful intercept, charging, and some policy enforcement.

The P-GW 923 may terminate an SGi interface toward a PDN. The P-GW 923 may route data packets between the EPC network 923 and external networks such as a network including the application server 930 (alternatively referred to as application function (AF)) via an Internet Protocol (IP) interface 925. Generally, the application server 930 may be an element offering applications that use IP bearer resources with the core network (e.g., UMTS Packet Services (PS) domain, LTE PS data services, etc.). In this embodiment, the P-GW 923 is shown to be communicatively coupled to an application server 930 via an IP communications interface 925. The application server 930 can also be configured to support one or more communication services (e.g., Voice-over-Internet Protocol (VoIP) sessions, PTT sessions, group communication sessions, social networking services, etc.) for the UEs 901 and 902 via the CN 920.

The P-GW 923 may further be a node for policy enforcement and charging data collection. Policy and Charging Enforcement Function (PCRF) 926 is the policy and charging control element of the CN 920. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 926 may be communicatively coupled to the application server 930 via the P-GW 923. The application server 930 may signal the PCRF 926 to indicate a new service flow and select the appropriate Quality of Service (QoS) and charging parameters. The PCRF 926 may provision this rule into a Policy and Charging Enforcement Function (PCEF) (not shown) with the appropriate traffic flow template (TFT) and QoS class of identifier (QCI), which commences the QoS and charging as specified by the application server 930.

Figure 10:
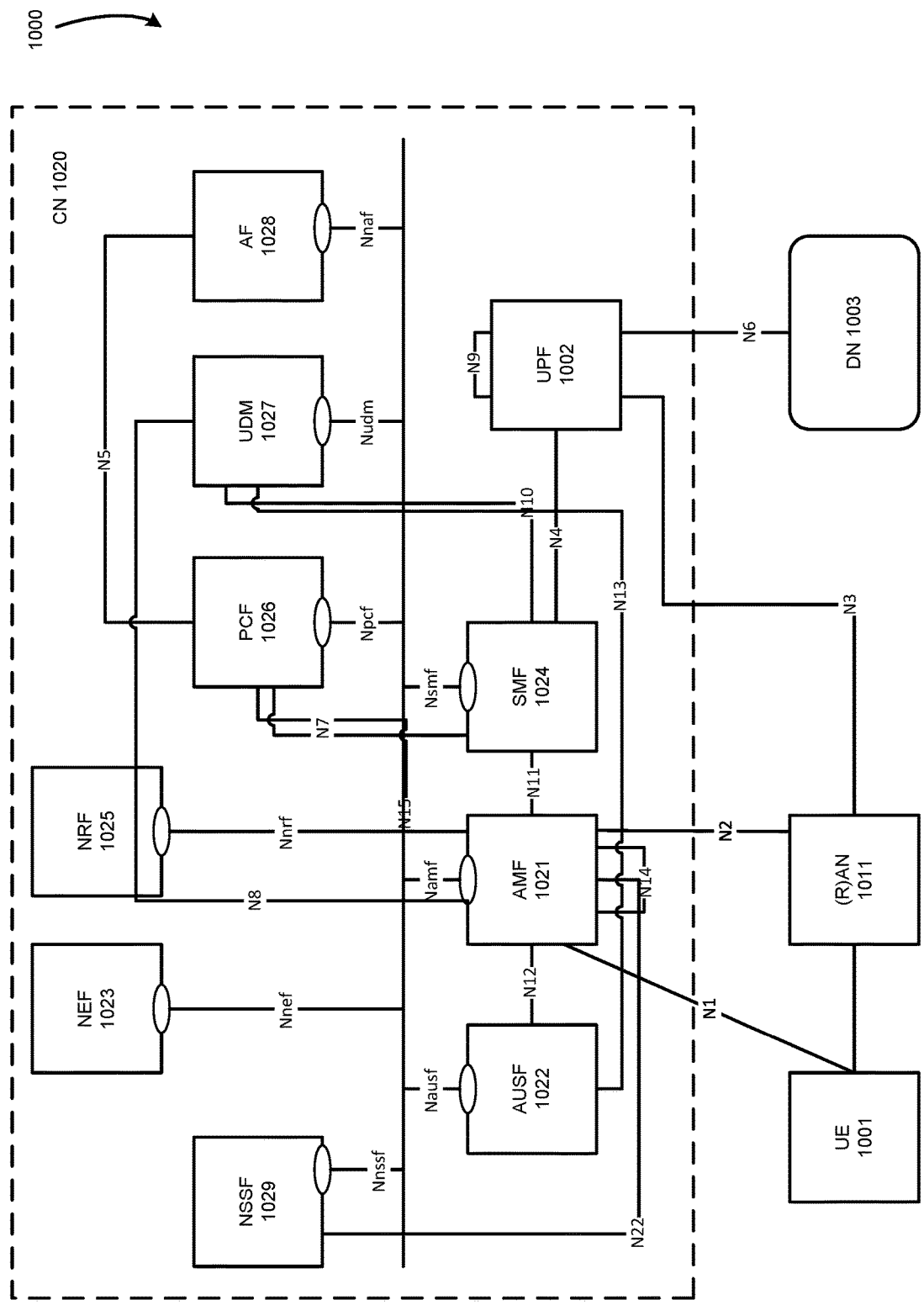
FIG. 10 illustrates an architecture of a system of a network in accordance with some embodiments.

FIG. 10 illustrates an architecture of a system 1000 of a network in accordance with some embodiments. The system 1000 is shown to include a UE 1001, which may be the same or similar to UEs 901 and 902 discussed previously; a RAN node 1011, which may be the same or similar to RAN nodes 911 and 912 discussed previously; a Data network (DN) 1003, which may be, for example, operator services, Internet access or 3rd party services; and a 5G Core Network (5GC or CN) 1020.

The CN 1020 may include an Authentication Server Function (AUSF) 1022; an Access and Mobility Management Function (AMF) 1021; a Session Management Function (SMF) 1024; a Network Exposure Function (NEF) 1023; a Policy Control function (PCF) 1026; a Network Function (NF) Repository Function (NRF) 1025; a Unified Data Management (UDM) 1027; an Application Function (AF) 1028; a User Plane Function (UPF) 1002; and a Network Slice Selection Function (NSSF) 1029.

The UPF 1002 may act as an anchor point for intra-RAT and inter-RAT mobility, an external PDU session point of interconnect to DN 1003, and a branching point to support multi-homed PDU session. The UPF 1002 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 1002 may include an uplink classifier to support routing traffic flows to a data network. The DN 1003 may represent various network operator services, Internet access, or third party services. NY 1003 may include, or be similar to application server 930 discussed previously. The UPF 1002 may interact with the SMF 1024 via an N4 reference point between the SMF 1024 and the UPF 1002.

The AUSF 1022 may store data for authentication of UE 1001 and handle authentication related functionality. The AUSF 1022 may facilitate a common authentication framework for various access types. The AUSF 1022 may communicate with the AMF 1021 via an N12 reference point between the AMF 1021 and the AUSF 1022; and may communicate with the UDM 1027 via an N13 reference point between the UDM 1027 and the AUSF 1022. Additionally, the AUSF 1022 may exhibit an Nausf service-based interface.

The AMF 1021 may be responsible for registration management (e.g., for registering UE 1001, etc.), connection management, reachability management, mobility management, and lawful interception of AMF-related events, and access authentication and authorization. The AMF 1021 may be a termination point for the an N11 reference point between the AMF 1021 and the SMF 1024. The AMF 1021 may provide transport for Session Management (SM) messages between the UE 1001 and the SMF 1024, and act as a transparent proxy for routing SM messages. AMF 1021 may also provide transport for short message service (SMS) messages between UE 1001 and an SMS function (SMSF) (not shown by FIG. 10). AMF 1021 may act as Security Anchor Function (SEA), which may include interaction with the AUSF 1022 and the UE 1001, receipt of an intermediate key that was established as a result of the UE 1001 authentication process. Where USIM based authentication is used, the AMF 1021 may retrieve the security material from the AUSF 1022. AMF 1021 may also include a Security Context Management (SCM) function, which receives a key from the SEA that it uses to derive access-network specific keys. Furthermore, AMF 1021 may be a termination point of RAN CP interface, which may include or be an N2 reference point between the (R)AN 1011 and the AMF 1021; and the AMF 1021 may be a termination point of NAS (N1) signalling, and perform NAS ciphering and integrity protection.

AMF 1021 may also support NAS signalling with a UE 1001 over an N3 interworking-function (IWF) interface. The N3IWF may be used to provide access to untrusted entities. N3IWF may be a termination point for the N2 interface between the (R)AN 1011 and the AMF 1021 for the control plane, and may be a termination point for the N3 reference point between the (R)AN 1011 and the UPF 1002 for the user plane. As such, the AMF 1021 may handle N2 signalling from the SMF 1024 and the AMF 1021 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 1001 and AMF 1021 via an N1 reference point between the UE 1001 and the AMF 1021, and relay uplink and downlink user-plane packets between the UE 1001 and UPF 1002. The N3IWF also provides mechanisms for IPsec tunnel establishment with the UE 1001. The AMF 1021 may exhibit an Namf service-based interface, and may be a termination point for an N14 reference point between two AMFs 1021 and an N17 reference point between the AMF 1021 and a 5G-Equipment Identity Register (5G-EIR) (not shown by FIG. 10).

The SMF 1024 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 1024 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN. An N16 reference point between two SMFs 1024 may be included in the system 1000, which may be between another SMF 1024 in a visited network and the SMF 1024 in the home network in roaming scenarios. Additionally, the SMF 1024 may exhibit the Nsmf service-based interface.

The NEF 1023 may provide means for securely exposing the services and capabilities provided by 3GPP network functions for third party, internal exposure/re-exposure, Application Functions (e.g., AF 1028), edge computing or fog computing systems, etc. In such embodiments, the NEF 1023 may authenticate, authorize, and/or throttle the AFs. NEF 1023 may also translate information exchanged with the AF 1028 and information exchanged with internal network functions. For example, the NEF 1023 may translate between an AF-Service-Identifier and an internal 5GC information. NEF 1023 may also receive information from other network functions (NFs) based on exposed capabilities of other network functions. This information may be stored at the NEF 1023 as structured data, or at a data storage NF using a standardized interfaces. The stored information can then be re-exposed by the NEF 1023 to other NFs and AFs, and/or used for other purposes such as analytics. Additionally, the NEF 1023 may exhibit an Nnef service-based interface.

The NRF 1025 may support service discovery functions, receive NF Discovery Requests from NF instances, and provide the information of the discovered NF instances to the NF instances. NRF 1025 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 1025 may exhibit the Nnrf service-based interface.

The PCF 1026 may provide policy rules to control plane function(s) to enforce them, and may also support unified policy framework to govern network behaviour. The PCF 1026 may also implement a front end (FE) to access subscription information relevant for policy decisions in a UDR of the UDM 1027. The PCF 1026 may communicate with the AMF 1021 via an N15 reference point between the PCF 1026 and the AMF 1021, which may include a PCF 1026 in a visited network and the AMF 1021 in case of roaming scenarios. The PCF 1026 may communicate with the AF 1028 via an N5 reference point between the PCF 1026 and the AF 1028; and with the SMF 1024 via an N7 reference point between the PCF 1026 and the SMF 1024. The system 1000 and/or CN 1020 may also include an N24 reference point between the PCF 1026 (in the home network) and a PCF 1026 in a visited network. Additionally, the PCF 1026 may exhibit an Npcf service-based interface.

The UDM 1027 may handle subscription-related information to support the network entities' handling of communication sessions, and may store subscription data of UE 1001. For example, subscription data may be communicated between the UDM 1027 and the AMF 1021 via an N8 reference point between the UDM 1027 and the AMF 1021 (not shown by FIG. 10). The UDM 1027 may include two parts, an application FE and a User Data Repository (UDR) (the FE and UDR are not shown by FIG. 10). The UDR may store subscription data and policy data for the UDM 1027 and the PCF 1026, and/or structured data for exposure and application data (including Packet Flow Descriptions (PFDs) for application detection, application request information for multiple UEs 1001) for the NEF 1023. The Nudr service-based interface may be exhibited by the UDR 1021 to allow the UDM 1027, PCF 1026, and NEF 1023 to access a particular set of the stored data, as well as to read, update (e.g., add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 1024 via an N10 reference point between the UDM 1027 and the SMF 1024. UDM 1027 may also support SMS management, wherein an SMS-FE implements the similar application logic as discussed previously. Additionally, the UDM 1027 may exhibit the Nudm service-based interface.

The AF 1028 may provide application influence on traffic routing, access to the Network Capability Exposure (NCE), and interact with the policy framework for policy control. The NCE may be a mechanism that allows the 5GC and AF 1028 to provide information to each other via NEF 1023, which may be used for edge computing implementations. In such implementations, the network operator and third party services may be hosted close to the UE 1001 access point of attachment to achieve an efficient service delivery through the reduced end-to-end latency and load on the transport network. For edge computing implementations, the 5GC may select a UPF 1002 close to the UE 1001 and execute traffic steering from the UPF 1002 to DN 1003 via the N6 interface. This may be based on the UE subscription data, UE location, and information provided by the AF 1028. In this way, the AF 1028 may influence UPF (re)selection and traffic routing. Based on operator deployment, when AF 1028 is considered to be a trusted entity, the network operator may permit AF 1028 to interact directly with relevant NFs. Additionally, the AF 1028 may exhibit an Naf service-based interface.

The NSSF 1029 may select a set of network slice instances serving the UE 1001. The NSSF 1029 may also determine allowed Network Slice Selection Assistance Information (NSSAI) and the mapping to the Subscribed Single-NSSAIs (S-NSSAIs), if needed. The NSSF 1029 may also determine the AMF set to be used to serve the UE 1001, or a list of candidate AMF(s) 1021 based on a suitable configuration and possibly by querying the NRF 1025. The selection of a set of network slice instances for the UE 1001 may be triggered by the AMF 1021 with which the UE 1001 is registered by interacting with the NSSF 1029, which may lead to a change of AMF 1021. The NSSF 1029 may interact with the AMF 1021 via an N22 reference point between AMF 1021 and NSSF 1029; and may communicate with another NSSF 1029 in a visited network via an N31 reference point (not shown by FIG. 10). Additionally, the NSSF 1029 may exhibit an Nnssf service-based interface.

As discussed previously, the CN 1020 may include an SMSF, which may be responsible for SMS subscription checking and verification, and relaying SM messages to/from the UE 1001 to/from other entities, such as an SMS-GMSC/IWMSC/SMS-router. The SMS may also interact with AMF 1021 and UDM 1027 for notification procedure that the UE 1001 is available for SMS transfer (e.g., set a UE not reachable flag, and notifying UDM 1027 when UE 1001 is available for SMS).

The CN 1020 may also include other elements that are not shown by FIG. 10, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 10). Individual NFs may share a UDSF for storing their respective unstructured data or individual NFs may each have their own UDSF located at or near the individual NFs. Additionally, the UDSF may exhibit an Nudsf service-based interface (not shown by FIG. 10). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 10 for clarity. In one example, the CN 1020 may include an Nx interface, which is an inter-CN interface between the MME (e.g., MME 921) and the AMF 1021 in order to enable interworking between CN 1020 and CN 920. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

In yet another example, system 1000 may include multiple RAN nodes 1011 wherein an Xn interface is defined between two or more RAN nodes 1011 (e.g., gNBs and the like) that connecting to 5GC 1020, between a RAN node 1011 (e.g., gNB) connecting to 5GC 1020 and an eNB (e.g., a RAN node 911 of FIG. 9), and/or between two eNBs connecting to 5GC 1020. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1001 in a connected mode (e.g., CM-CONNECTED) including functionality to manage the UE mobility for connected mode between one or more RAN nodes 1011. The mobility support may include context transfer from an old (source) serving RAN node 1011 to new (target) serving RAN node 1011; and control of user plane tunnels between old (source) serving RAN node 1011 to new (target) serving RAN node 1011. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs.

In other implementations, the Xn-U protocol stack and/or the Xn-C protocol stack may be same or similar to the user plane and/or control plane protocol stack(s) shown and described herein.

Figure 11:
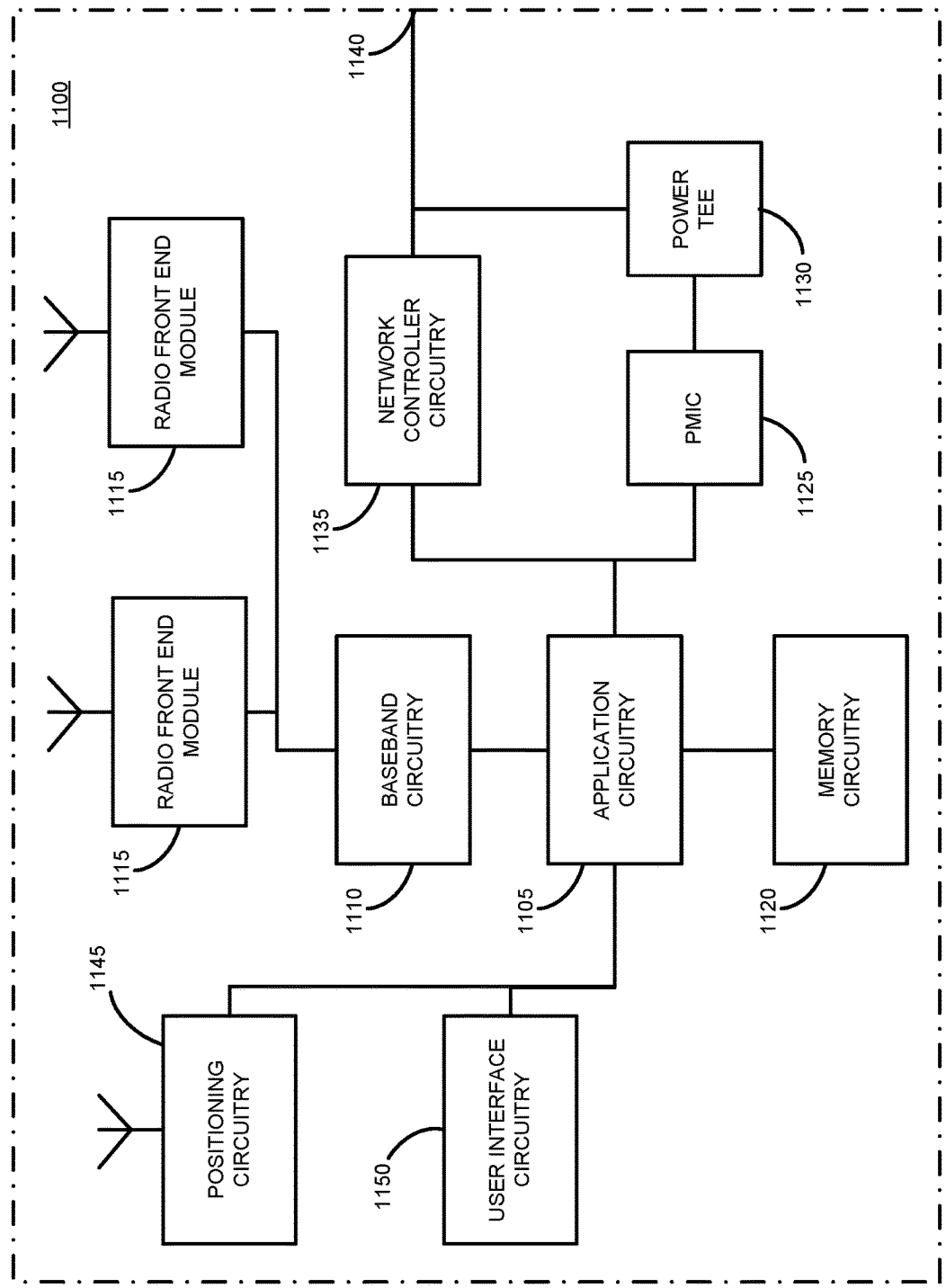
FIG. 11 illustrates an example of infrastructure equipment in accordance with various embodiments.

FIG. 11 illustrates an example of infrastructure equipment 1100 in accordance with various embodiments. The infrastructure equipment 1100 (or "system 1100") may be implemented as a base station, radio head, RAN node, etc., such as the RAN nodes 911 and 912, and/or AP 906 shown and described previously. In other examples, the system 1100 could be implemented in or by a UE, application server(s) 930, and/or any other element/device discussed herein. The system 1100 may include one or more of application circuitry 1105, baseband circuitry 1110, one or more radio front end modules 1115, memory 1120, power management integrated circuitry (PMIC) 1125, power tee circuitry 1130, network controller 1135, network interface connector 1140, satellite positioning circuitry 1145, and user interface 1150. In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 920 (or CN 1020 discussed infra) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 1105 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 1105 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 1100 may not utilize application circuitry 1105, and instead may include a special-purpose processor/controller to process IP data received from an EPC or SGC, for example.

Additionally or alternatively, application circuitry 1105 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1105 may comprise logic blocks or logic fabric including and other interconnected resources that may be programmed to perform various functions, such as the procedures, methods, functions, etc. of the various embodiments discussed herein. In such embodiments, the circuitry of application circuitry 1105 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 1110 may be implemented, for example, as a solder-down substrate including one or more integrated circuits, a single packaged integrated circuit soldered to a main circuit board or a multi-chip module containing two or more integrated circuits. Although not shown, baseband circuitry 1110 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1110 may include protocol processing circuitry with one or more instances of control circuitry (not shown) to provide control functions for the digital baseband circuitry and/or radio frequency circuitry (for example, the radio front end modules 1115).

User interface circuitry 1150 may include one or more user interfaces designed to enable user interaction with the system 1100 or peripheral component interfaces designed to enable peripheral component interaction with the system 1100. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 1115 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 1115. The RFEMs 1115 may incorporate both millimeter wave antennas and sub-millimeter wave antennas.

The memory circuitry 1120 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1120 may be implemented as one or more of solder down packaged integrated circuits, socketed memory modules and plug-in memory cards.

The PMIC 1125 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1130 may provide for electrical power drawn from a network cable to provide both power supply and data connectivity to the infrastructure equipment 1100 using a single cable.

The network controller circuitry 1135 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1100 via network interface connector 1140 using a physical connection, which may be electrical (commonly referred to as a "copper interconnect"), optical, or wireless. The network controller circuitry 1135 may include one or more dedicated processors and/or FPGAs to communicate using one or more of the aforementioned protocol. In some implementations, the network controller circuitry 1135 may include multiple controllers to provide connectivity to other networks using the same or different protocols.

The positioning circuitry 1145, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1145 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 1145 and/or positioning circuitry implemented by UEs 901, 902, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 1145 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 1145 may provide data to application circuitry 1105 which may include one or more of position data or time data. Application circuitry 1105 may use the time data to synchronize operations with other radio base stations (e.g., RAN nodes 911, 912, 1011 or the like).

The components shown by FIG. 11 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 12:
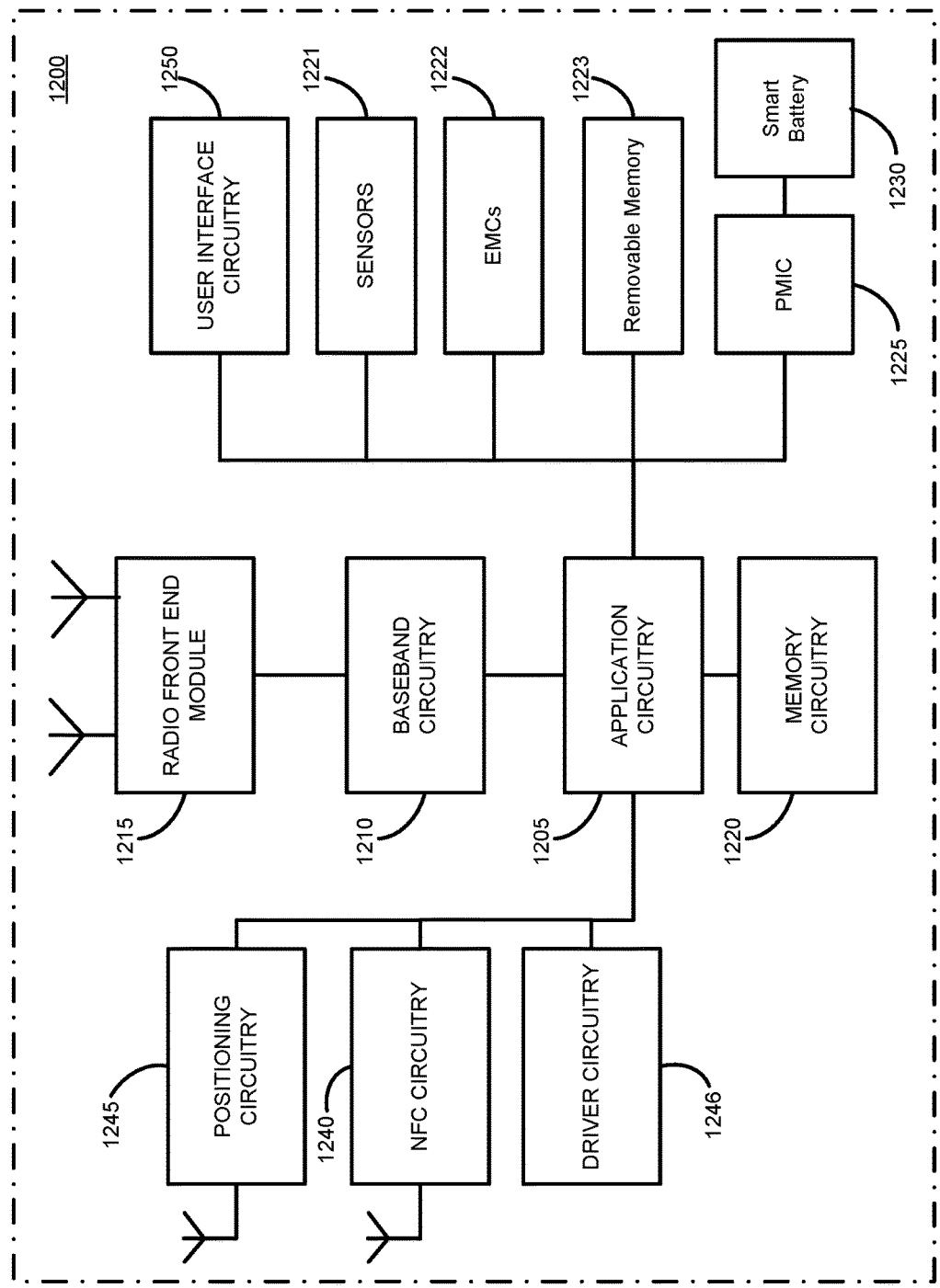
FIG. 12 illustrates an example of a platform 1200 (or "device 1200") in accordance with various embodiments.

FIG. 12 illustrates an example of a platform 1200 (or "device 1200") in accordance with various embodiments. In embodiments, the computer platform 1200 may be suitable for use as UEs 901, 902, 1001, application servers 930, and/or any other element/device discussed herein. The platform 1200 may include any combinations of the components shown in the example. The components of platform 1200 may be implemented as integrated circuits (ICs), portions thereof, discrete electronic devices, or other modules, logic, hardware, software, firmware, or a combination thereof adapted in the computer platform 1200, or as components otherwise incorporated within a chassis of a larger system. The block diagram of FIG. 12 is intended to show a high level view of components of the computer platform 1200. However, some of the components shown may be omitted, additional components may be present, and different arrangement of the components shown may occur in other implementations.

The application circuitry 1205 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 1200. In some embodiments, processors of application circuitry 1105/1205 may process IP data packets received from an EPC or SGC.

Application circuitry 1205 be or include a microprocessor, a multi-core processor, a multithreaded processor, an ultra-low voltage processor, an embedded processor, or other known processing element. In one example, the application circuitry 1205 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 1205 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 1205 may be a part of a system on a chip (SoC) in which the application circuitry 1205 and other components are formed into a single integrated circuit, or a single package, such as the Edison™ or Galileo™ SoC boards from Intel® Corporation.

Additionally or alternatively, application circuitry 1205 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1205 may comprise logic blocks or logic fabric including and other interconnected resources that may be programmed to perform various functions, such as the procedures, methods, functions, etc. of the various embodiments discussed herein. In such embodiments, the circuitry of application circuitry 1205 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 1220 may be implemented, for example, as a solder-down substrate including one or more integrated circuits, a single packaged integrated circuit soldered to a main circuit board or a multi-chip module containing two or more integrated circuits. Although not shown, baseband circuitry 1200 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 120 may include protocol processing circuitry with one or more instances of control circuitry (not shown) to provide control functions for the digital baseband circuitry and/or radio frequency circuitry (for example, the radio front end modules 1215).

The radio front end modules (RFEMs) 1215 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 1215. The RFEMs 1215 may incorporate both millimeter wave antennas and sub-millimeter wave antennas.

The memory circuitry 1220 may include any number and type of memory devices used to provide for a given amount of system memory. As examples, the memory circuitry 1220 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1220 may be developed in accordance with a Joint Electron Devices Engineering Council (JEDEC) low power double data rate (LPDDR)-based design, such as LPDDR2, LPDDR3, LPDDR4, or the like. Memory circuitry 1120 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1220 may be on-die memory or registers associated with the application circuitry 1205. To provide for persistent storage of information such as data, applications, operating systems and so forth, memory circuitry 1220 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1200 may incorporate the three-dimensional (3D) cross-point (XPOINT) memories from Intel® and Micron®.

Removable memory circuitry 1223 may include devices, circuitry, enclosures/housings, ports or receptacles, etc. used to coupled portable data storage devices with the platform 1200. These portable data storage devices may be used for mass storage purposes, and may include, for example, flash memory cards (e.g., Secure Digital (SD) cards, microSD cards, xD picture cards, and the like), and USB flash drives, optical discs, e12ernal HDDs, and the like.

The platform 1200 may also include interface circuitry (not shown) that is used to connect e12ernal devices with the platform 1200. The external devices connected to the platform 1200 via the interface circuitry may include sensors 1221, such as accelerometers, level sensors, flow sensors, temperature sensors, pressure sensors, barometric pressure sensors, and the like. The interface circuitry may be used to connect the platform 1200 to electro-mechanical components (EMCs) 1222, which may allow platform 1200 to change its state, position, and/or orientation, or move or control a mechanism or system. The EMCs 1222 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1200 may be configured to operate one or more EMCs 1222 based on one or more captured events and/or instructions or control signals received from a service provider and/or various clients.

In some implementations, the interface circuitry may connect the platform 1200 with positioning circuitry 1245, which may be the same or similar as the positioning circuitry 1245 discussed with regard to FIG. 11.

In some implementations, the interface circuitry may connect the platform 1200 with near-field communication (NFC) circuitry 1240, which may include an NFC controller coupled with an antenna element and a processing device.

The NFC circuitry 1240 may be configured to read electronic tags and/or connect with another NFC-enabled device.

The driver circuitry 1246 may include software and hardware elements that operate to control particular devices that are embedded in the platform 1200, attached to the platform 1200, or otherwise communicatively coupled with the platform 1200. The driver circuitry 1246 may include individual drivers allowing other components of the platform 1200 to interact or control various input/output (I/O) devices that may be present within, or connected to, the platform 1200. For example, driver circuitry 1246 may include a display driver to control and allow access to a display device, a touchscreen driver to control and allow access to a touchscreen interface of the platform 1200, sensor drivers to obtain sensor readings of sensors 1221 and control and allow access to sensors 1221, EMC drivers to obtain actuator positions of the EMCs 1222 and/or control and allow access to the EMCs 1222, a camera driver to control and allow access to an embedded image capture device, audio drivers to control and allow access to one or more audio devices.

The power management integrated circuitry (PMIC) 1225 (also referred to as "power management circuitry 1225") may manage power provided to various components of the platform 1200. In particular, with respect to the baseband circuitry 120, the PMIC 1225 may control power-source selection, voltage scaling, battery charging, or DC-to-DC conversion. The PMIC 1225 may often be included when the platform 1200 is capable of being powered by a battery 1230, for example, when the device is included in a UE 901, 902, 1001.

In some embodiments, the PMIC 1225 may control, or otherwise be part of, various power saving mechanisms of the platform 1200. For example, if the platform 1200 is in an RRC_Connected state, where it is still connected to the RAN node as it expects to receive traffic shortly, then it may enter a state known as Discontinuous Reception Mode (DRX) after a period of inactivity. During this state, the platform 1200 may power down for brief intervals of time and thus save power. If there is no data traffic activity for an e12ended period of time, then the platform 1200 may transition off to an RRC_Idle state, where it disconnects from the network and does not perform operations such as channel quality feedback, handover, etc. The platform 1200 goes into a very low power state and it performs paging where again it periodically wakes up to listen to the network and then powers down again. The platform 1200 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1230 may power the platform 1200, although in some examples the platform 1200 may be mounted deployed in a fixed location, and may have a power supply coupled to an electrical grid. The battery 1230 may be a lithium ion battery, a metal-air battery, such as a zinc-air battery, an aluminum-air battery, a lithium-air battery, and the like. In some implementations, such as in V2X applications, the battery 1230 may be a typical lead-acid automotive battery.

In some implementations, the battery 1230 may be a "smart battery," which includes or is coupled with a Battery Management System (BMS) or battery monitoring integrated circuitry. The BMS may be included in the platform 1200 to track the state of charge (SoCh) of the battery 1230. The BMS may be used to monitor other parameters of the battery 1230 to provide failure predictions, such as the state of health (SoH) and the state of function (SoF) of the battery 1230. The BMS may communicate the information of the battery 1230 to the application circuitry 1205 or other components of the platform 1200. The BMS may also include an analog-to-digital (ADC) convertor that allows the application circuitry 1205 to directly monitor the voltage of the battery 1230 or the current flow from the battery 1230. The battery parameters may be used to determine actions that the platform 1200 may perform, such as transmission frequency, network operation, sensing frequency, and the like.

A power block, or other power supply coupled to an electrical grid may be coupled with the BMS to charge the battery 1230. In some examples, the power block 928 may be replaced with a wireless power receiver to obtain the power wirelessly, for example, through a loop antenna in the computer platform 1200. In these examples, a wireless battery charging circuit may be included in the BMS. The specific charging circuits chosen may depend on the size of the battery 1230, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 1200 may communicate with one another using a suitable bus technology, which may include any number of technologies, including industry standard architecture (ISA), e12ended ISA (EISA), peripheral component interconnect (PCI), peripheral component interconnect e12ended (PCIx), PCI express (PCIe), a Time-Trigger Protocol (TTP) system, or a Fle10ay system, or any number of other technologies. The bus may be a proprietary bus, for example, used in a SoC based system. Other bus systems may be included, such as an I2C interface, an SPI interface, point to point interfaces, and a power bus, among others.

Figure 13:
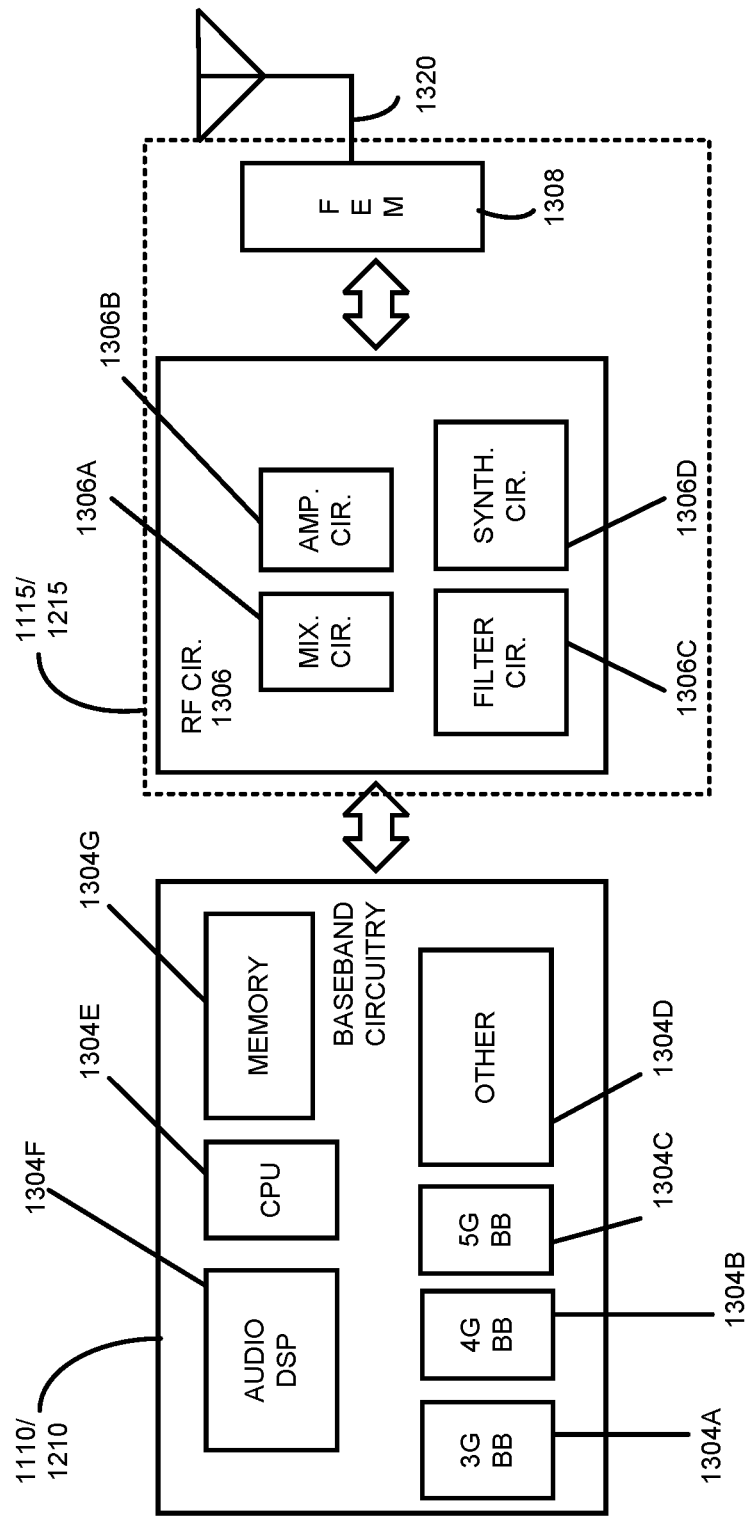
FIG. 13 illustrates example components of baseband circuitry and radio front end modules in accordance with various embodiments.

FIG. 13 illustrates example components of baseband circuitry 1110/120 and radio front end modules (RFEM) 1115/125 in accordance with some embodiments. As shown, the RFEM 1115/1215 may include Radio Frequency (RF) circuitry 1306, front-end module (FEM) circuitry 1308, one or more antennas 1320 coupled together at least as shown.

The baseband circuitry 1110/1210 may include circuitry such as, but not limited to, one or more single-core or multi-core processors. The baseband circuitry 1110/1210 may include one or more baseband processors or control logic to process baseband signals received from a receive signal path of the RF circuitry 1306 and to generate baseband signals for a transmit signal path of the RF circuitry 1306. Baseband processing circuitry 1110/120 may interface with the application circuitry 1105/1205 for generation and processing of the baseband signals and for controlling operations of the RF circuitry 1306. For example, in some embodiments, the baseband circuitry 1110/120 may include a third generation (3G) baseband processor 1304A, a fourth generation (4G) baseband processor 1304B, a fifth generation (5G) baseband processor 1304C, or other baseband processor(s) 1304D for other existing generations, generations in development or to be developed in the future (e.g., second generation (2G), sixth generation (6G), etc.). The baseband circuitry 1110/1210 (e.g., one or more of baseband processors 1304A-D) may handle various radio control functions that enable communication with one or more radio networks via the RF circuitry 1306. In other embodiments, some or all of the functionality of baseband processors 1304A-D may be included in modules stored in the memory 1304G and executed via a Central Processing Unit (CPU) 1304E. The radio control functions may include, but are not limited to, signal modulation/demodulation, encoding/decoding, radio frequency shifting, etc. In some embodiments, modulation/demodulation circuitry of the baseband circuitry 1110/1210 may include Fast-Fourier Transform (FFT), precoding, or constellation mapping/demapping functionality. In some embodiments, encoding/decoding circuitry of the baseband circuitry 1110/1210 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1110/1210 may include one or more audio digital signal processor(s) (DSP) 1304F. The audio DSP(s) 1304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1110/1210 and the application circuitry 1105/1205 may be implemented together such as, for example, on a system on a chip (SOC).

In some embodiments, the baseband circuitry 1110/1210 may provide for communication compatible with one or more radio technologies. For example, in some embodiments, the baseband circuitry 1110/1210 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1110/1210 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1208 and provide baseband signals to the baseband circuitry 1110/1210. RF circuitry 1306 may also include a transmit signal path which may include circuitry to up-convert baseband signals provided by the baseband circuitry 1110/1210 and provide RF output signals to the FEM circuitry 1208 for transmission.

In some embodiments, the receive signal path of the RF circuitry 1306 may include mixer circuitry 1306*a*, amplifier circuitry 1306*b* and filter circuitry 1306*c*. In some embodiments, the transmit signal path of the RF circuitry 1306 may include filter circuitry 1306*c* and mixer circuitry 1306*a*. RF circuitry 1306 may also include synthesizer circuitry 1306*d* for synthesizing a frequency for use by the mixer circuitry 1306*a* of the receive signal path and the transmit signal path. In some embodiments, the mixer circuitry 1306*a* of the receive signal path may be configured to down-convert RF signals received from the FEM circuitry 1208 based on the synthesized frequency provided by synthesizer circuitry

1306*d*. The amplifier circuitry 1306*b* may be configured to amplify the down-converted signals and the filter circuitry 1306*c* may be a low-pass filter (LPF) or band-pass filter (BPF) configured to remove unwanted signals from the down-converted signals to generate output baseband signals. Output baseband signals may be provided to the baseband circuitry 1110/1210 for further processing. In some embodiments, the output baseband signals may be zero-frequency baseband signals, although this is not a requirement. In some embodiments, mixer circuitry 1306*a* of the receive signal path may comprise passive mixers, although the scope of the embodiments is not limited in this respect.

In some embodiments, the mixer circuitry 1306*a* of the transmit signal path may be configured to up-convert input baseband signals based on the synthesized frequency provided by the synthesizer circuitry 1306*d* to generate RF output signals for the FEM circuitry 1308. The baseband signals may be provided by the baseband circuitry 1110/1210 and may be filtered by filter circuitry 1306*c*.

In some embodiments, the mixer circuitry 1306*a* of the receive signal path and the mixer circuitry 1306*a* of the transmit signal path may include two or more mixers and may be arranged for quadrature downconversion and upconversion, respectively. In some embodiments, the mixer circuitry 1306*a* of the receive signal path and the mixer circuitry 1306*a* of the transmit signal path may include two or more mixers and may be arranged for image rejection (e.g., Hartley image rejection). In some embodiments, the mixer circuitry 1306*a* of the receive signal path and the mixer circuitry 1306*a* may be arranged for direct downconversion and direct upconversion, respectively. In some embodiments, the mixer circuitry 1306*a* of the receive signal path and the mixer circuitry 1306*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1110/1210 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306*d* may be a fractional-N synthesizer or a fractional N/N+1 synthesizer, although the scope of the embodiments is not limited in this respect as other types of frequency synthesizers may be suitable. For example, synthesizer circuitry 1306*d* may be a delta-sigma synthesizer, a frequency multiplier, or a synthesizer comprising a phase-locked loop with a frequency divider.

The synthesizer circuitry 1306*d* may be configured to synthesize an output frequency for use by the mixer circuitry 1306*a* of the RF circuitry 1306 based on a frequency input and a divider control input. In some embodiments, the synthesizer circuitry 1306*d* may be a fractional N/N+1 synthesizer.

In some embodiments, frequency input may be provided by a voltage controlled oscillator (VCO), although that is not a requirement. Divider control input may be provided by either the baseband circuitry 1110/1210 or the applications processor 1105/1205 depending on the desired output frequency. In some embodiments, a divider control input (e.g., N) may be determined from a look-up table based on a channel indicated by the applications processor 1105/1205.

Synthesizer circuitry 1306*d* of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1320, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1320. In various embodiments, the amplification through the transmit or receive signal paths may be done solely in the RF circuitry 1306, solely in the FEM 1308, or in both the RF circuitry 1306 and the FEM 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1320).

Processors of the application circuitry 1105/1205 and processors of the baseband circuitry 1110/1210 may be used to execute elements of one or more instances of a protocol stack. For example, processors of the baseband circuitry 1110/1210, alone or in combination, may be used execute Layer 3, Layer 2, or Layer 1 functionality, while processors of the baseband circuitry 1110/1210 may utilize data (e.g., packet data) received from these layers and further execute Layer 4 functionality (e.g., transmission communication protocol (TCP) and user datagram protocol (UDP) layers).

As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
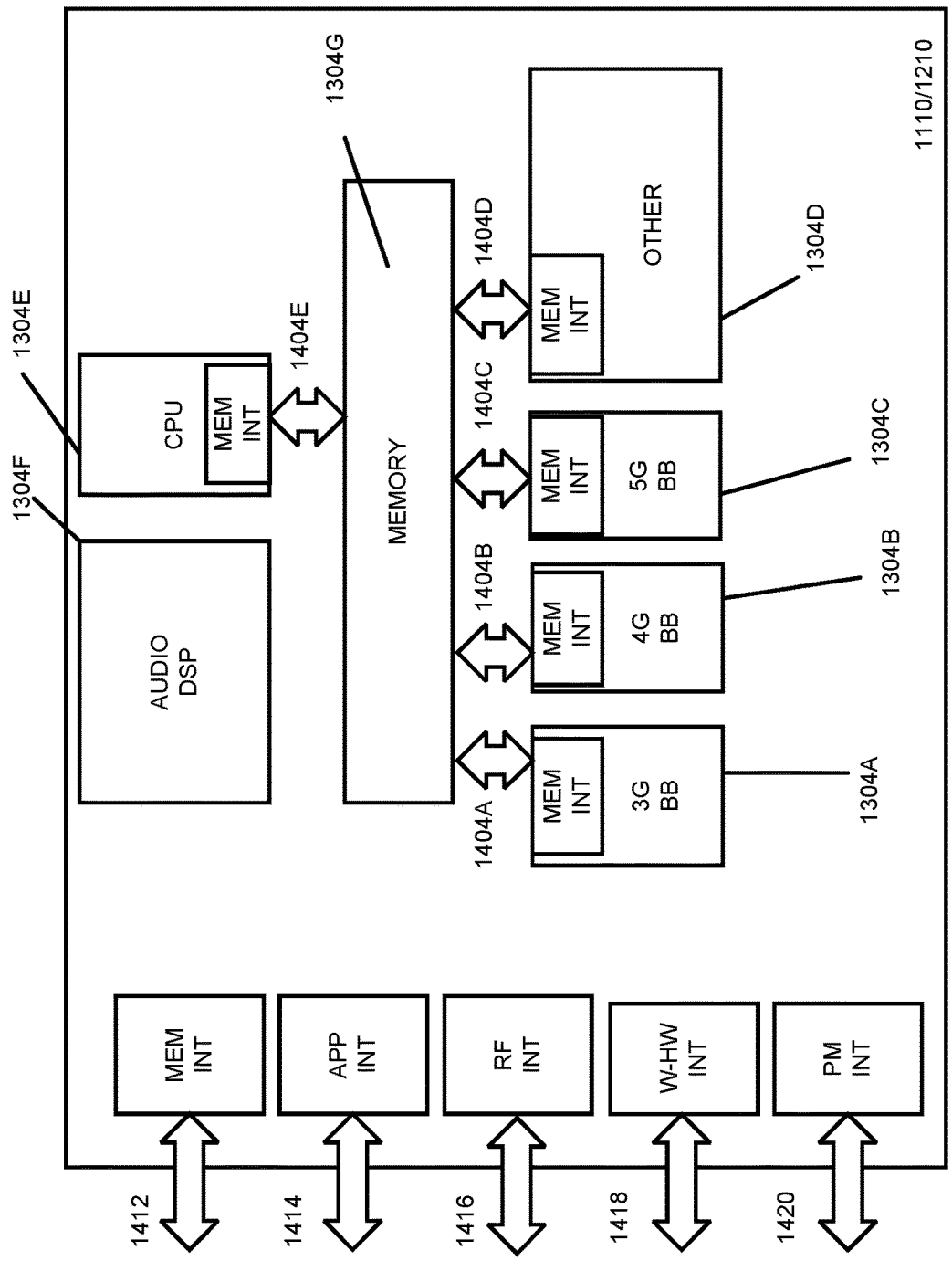
FIG. 14 illustrates example interfaces of baseband circuitry in accordance with some embodiments.

FIG. 14 illustrates example interfaces of baseband circuitry in accordance with some embodiments. As discussed above, the baseband circuitry 1110/1210 of FIGS. 11-12 may comprise processors 1204A-1204E and a memory 1304G utilized by said processors. Each of the processors 1304A-1304E may include a memory interface, 1404A-1404E, respectively, to send/receive data to/from the memory 1304G.

The baseband circuitry 1110/1210 may further include one or more interfaces to communicatively couple to other circuitries/devices, such as a memory interface 1412 (e.g., an interface to send/receive data to/from memory external to the baseband circuitry 1110/1210), an application circuitry interface 1414 (e.g., an interface to send/receive data to/from the application circuitry 1105/1205 of FIGS. 11-12), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMIC 1225.

Figure 15:
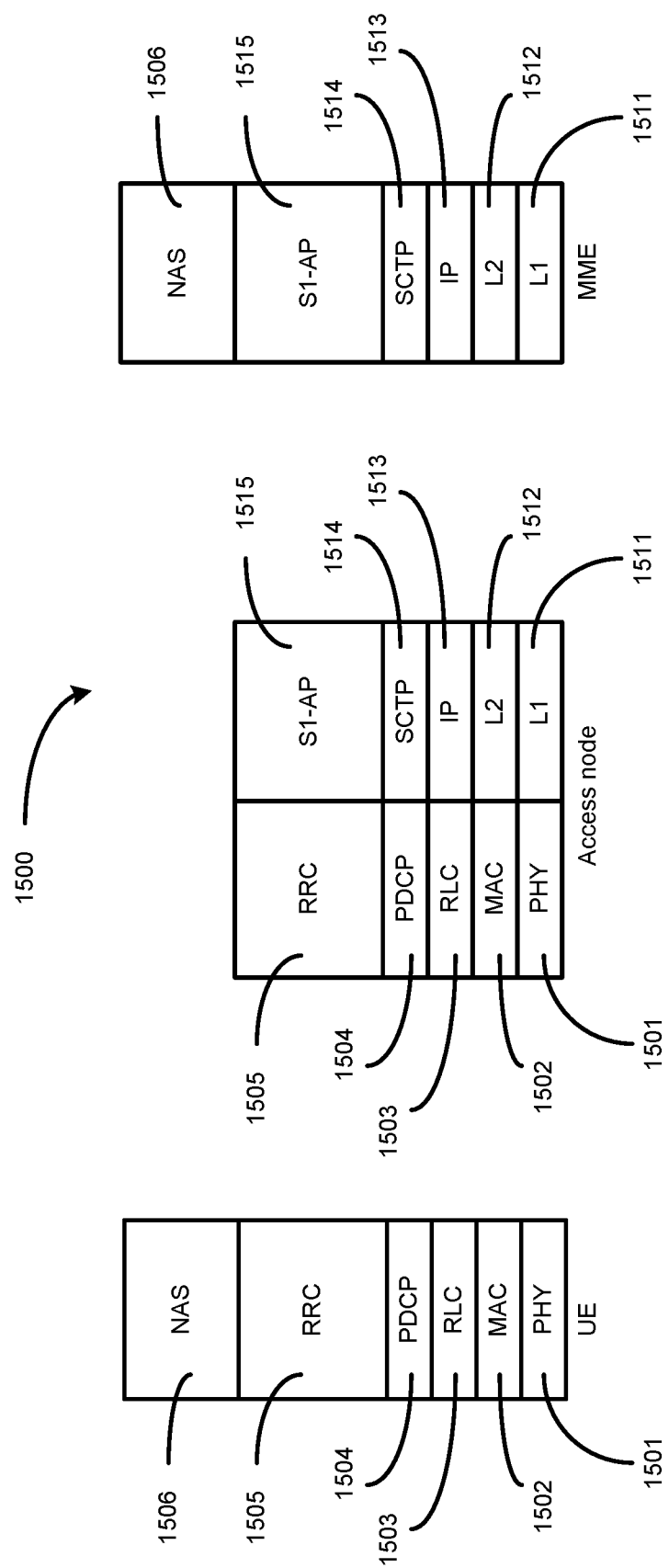
FIG. 15 is an illustration of a control plane protocol stack in accordance with some embodiments.

FIG. 15 is an illustration of a control plane protocol stack in accordance with some embodiments. In this embodiment, a control plane 1500 is shown as a communications protocol stack between the UE 901 (or alternatively, the UE 902), the RAN node 911 (or alternatively, the RAN node 912), and the MME 921.

The PHY layer 1501 may transmit or receive information used by the MAC layer 1502 over one or more air interfaces. The PHY layer 1501 may further perform link adaptation or adaptive modulation and coding (AMC), power control, cell search (e.g., for initial synchronization and handover purposes), and other measurements used by higher layers, such as the RRC layer 1505. The PHY layer 1501 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1502 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer 1503 may operate in a plurality of modes of operation, including: Transparent Mode™, Unacknowledged Mode (UM), and Acknowledged Mode (AM). The RLC layer 1503 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1503 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1504 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1505 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 901 and the RAN node 911 may utilize a Uu interface (e.g., an LTE-Uu interface) to exchange control plane data via a protocol stack comprising the PHY layer 1501, the MAC layer 1502, the RLC layer 1503, the PDCP layer 1504, and the RRC layer 1505.

The non-access stratum (NAS) protocols 1506 form the highest stratum of the control plane between the UE 901 and the MME 921. The NAS protocols 1506 support the mobility of the UE 901 and the session management procedures to establish and maintain IP connectivity between the UE 901 and the P-GW 923.

The S1 Application Protocol (S1-AP) layer 1515 may support the functions of the S1 interface and comprise Elementary Procedures (EPs). An EP is a unit of interaction between the RAN node 911 and the CN 920. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1514 may ensure reliable delivery of signaling messages between the RAN node 911 and the MME 921 based, in part, on the IP protocol, supported by the IP layer 1513. The L2 layer 1512 and the L1 layer 1511 may refer to communication links (e.g., wired or wireless) used by the RAN node and the MME to exchange information.

The RAN node 911 and the MME 921 may utilize an S1-MME interface to exchange control plane data via a protocol stack comprising the L1 layer 1511, the L2 layer 1512, the IP layer 1513, the SCTP layer 1514, and the S1-AP layer 1515.

Figure 16:
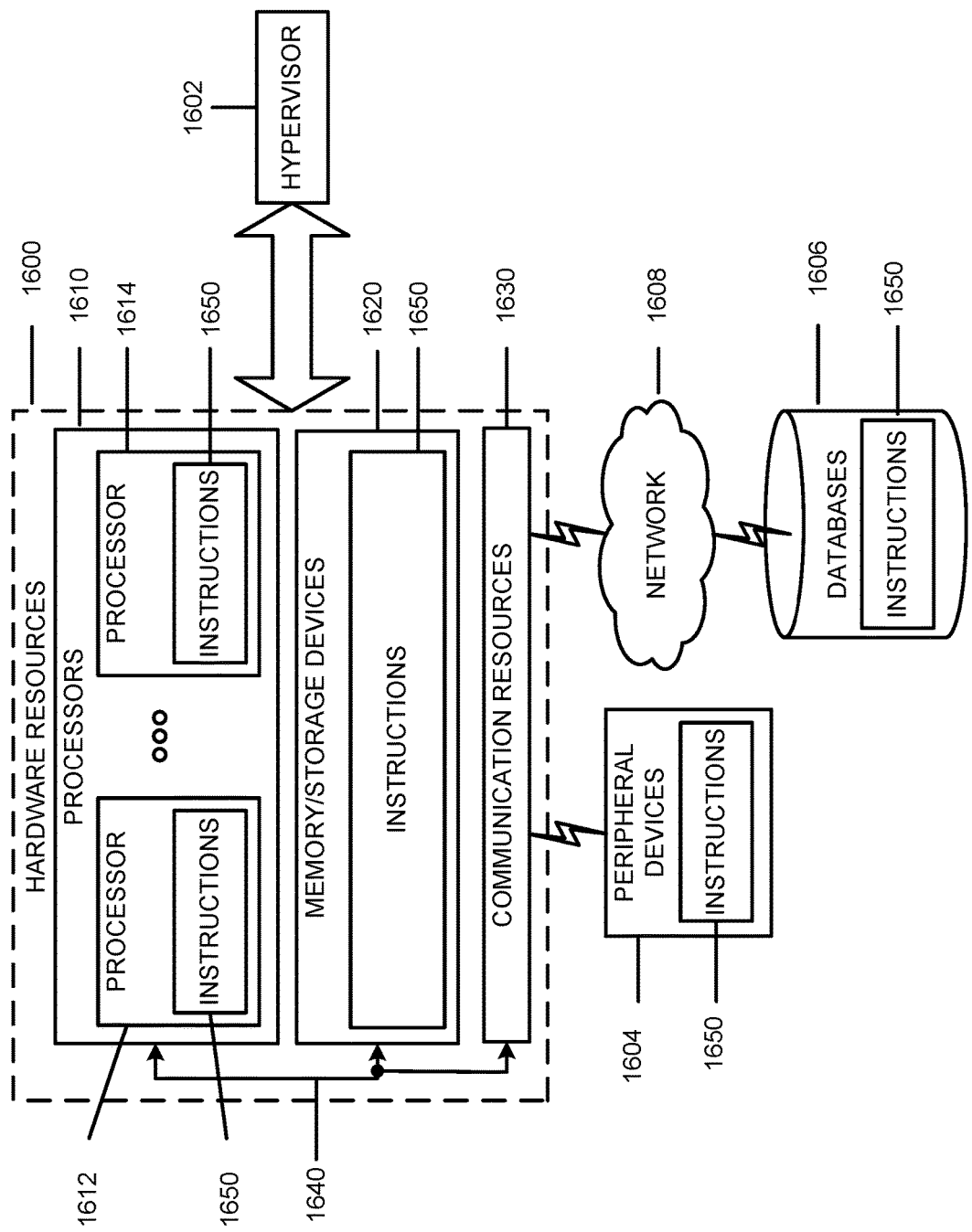
FIG. 16 is a block diagram illustrating components, according to some example embodiments, able to read instructions from a machine-readable or computer-readable medium (e.g., a non-transitory machine-readable storage medium) and perform any one or more of the methodologies discussed herein.

FIG. 16 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1600 including one or more processors (or processor cores) 1610, one or more memory/storage devices 1620, and one or more communication resources 1630, each of which may be communicatively coupled via a bus 1640. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1602 may be executed to provide an execution environment for one or more network slices/subslices to utilize the hardware resources 1600. A "virtualized resource" may refer to compute, storage, and/or network resources provided by virtualization infrastructure to an application, device, system, etc.

The processors 1610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1612 and a processor 1614.

The memory/storage devices 1620 may include main memory, disk storage, or any suitable combination thereof. The memory/storage devices 1620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1630 may include interconnection or network interface components or other suitable devices to communicate with one or more peripheral devices 1604 or one or more databases 1606 via a network 1608. For example, the communication resources 1630 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1650 may comprise software, a program, an application, an applet, an app, or other executable code for causing at least any of the processors 1610 to perform any one or more of the methodologies discussed herein. The instructions 1650 may reside, completely or partially, within at least one of the processors 1610 (e.g., within the processor's cache memory), the memory/storage devices 1620, or any suitable combination thereof. Furthermore, any portion of the instructions 1650 may be transferred to the hardware resources 1600 from any combination of the peripheral devices 1604 or the databases 1606. Accordingly, the memory of processors 1610, the memory/storage devices 1620, the peripheral devices 1604, and the databases 1606 are examples of computer-readable and machine-readable media.

In some embodiments, the electronic device(s), network(s), system(s), chip(s) or component(s), or portions or implementations thereof, of FIGS. 9-16, or some other figure herein may be configured to perform one or more processes, techniques, or methods as described herein, or portions thereof. For example, the device of FIGS. 11, 12, and 16, and particularly, the baseband circuitry of FIGS. 13 and 14, may be configured to implement one or more of the processes described herein (for example, the operation flows/algorithmic structures of FIGS. 7 and 8.

Some non-limiting examples are provided below.

Example 1 may include the system and method of wireless communication for a fifth generation (5G) or new radio (NR) system: calculating, by UE, a number of reserved hybrid automatic repeat request-acknowledgement (HARQ-ACK) resource elements (RE); and mapping, by UE, the reserved HARQ-ACK REs on resource allocated for physical uplink shared channel (PUSCH).

Example 2 may include the subject matter of example 1 and/or some other examples herein, wherein same mapping rule defined for uplink control information (UCI) on PUSCH can be employed for reserved HARQ-ACK RE mapping.

Example 3 may include the subject matter of example 2 and/or some other examples herein, wherein reserved HARQ-ACK REs are mapped starting from the first non-demodulation reference signal (DM-RS) symbols after the first DM-RS symbol(s).

Example 4 may include the subject matter of example 1 and/or some other examples herein, wherein a K symbols can be reserved for HARQ-ACK, where K can be determined based on the number of reserved REs and allocated resource for PUSCH transmission Example 5 may or may not include the subject matter of example 1 and/or some other examples herein, wherein the number of reserved HARQ-ACK REs can be calculated based on the modulation and coding scheme (MCS) or spectrum efficiency of uplink shared channel (UL-SCH) data and relative beta offset assuming a fixed HARQ-ACK payload size or indicated HARQ-ACK payload size.

Example 6 may include the subject matter of example 1 and/or some other examples herein, wherein the number of reserved HARQ-ACK REs can be calculated based on the MCS or spectrum efficiency of channel state information (CSI) part 1 or a reference CSI part 2 and relative beta offset assuming a fixed HARQ-ACK payload size or indicated HARQ-ACK payload size.

Example 7 may include the subject matter of example 1 and/or some other examples herein, wherein a scaling factor can be applied on the calculation of the number of reserved HARQ-ACK REs.

Example 8 may include the subject matter of example 1 and/or some other examples herein, wherein when HARQ-ACK and CSI part 1 are present for transmission on PUSCH without UL-SCH, and the number of reserved HARQ-ACK REs is greater than actually transmitted HARQ-ACK REs, the unoccupied resource may be allocated for HARQ-ACK transmission or CSI part 1.

Example 9 may include the subject matter of example 1 and/or some other examples herein, wherein if the HARQ-ACK and/or CSI takes more than 1 symbol, and PT-RS is present, the PT-RS time domain density is to be fixed to be every symbol regardless of the scheduling MCS.

Example 10 may include the subject matter of example 1 and/or some other examples herein, wherein if the number of reserved REs for HARQ-ACK and/or CSI exceed a threshold, the UL-SCH is not to be scheduled.

Example 11 may include the subject matter of example 10 and/or some other examples herein, wherein the threshold can be fixed for slot based and non-slot based transmission or be determined by the number of REs used for PUSCH.

Example 12 may include the subject matter of example 1 and/or some other examples herein, wherein a certain portion of CSI part 1 is repeated and transmitted on the unused REs within the reserved REs Example 13 may include the subject matter of example 1 and/or some other examples herein, wherein a pseudo random (PN) sequence can be generated and mapped on the un-used RE within the reserved REs, wherein the length of the PN sequence can be determined on the size of un-used REs within the reserved REs, the modulation order for CSI transmission and the number of layers for PUSCH transmission.

Example 14 may include the subject matter of example 1 and/or some other examples herein, wherein the modulated symbols in first available used REs in the same subcarrier before or after the symbols where un-used REs are located can be copied and repeated in the un-used REs.

Example 15 may include a UE or components thereof to: identify a fixed hybrid automatic repeat request-acknowledgement (HARQ-ACK) payload size; calculate, based on the fixed HARQ-ACK payload size, a number of reserved HARQ-ACK resource elements (REs) to carry one or more HARQ-ACK bits; and map the number of HARQ-ACK REs on resources allocated for physical uplink shared channel (PUSCH) transmission.

Example 16 may include the UE, or components thereof, of example 15 and/or some other example herein, where the UE is to further identify a scaling factor; and calculate the number of reserved HARQ-ACK REs based on the scaling factor.

Example 17 may include the UE, or components thereof, of example 15 and/or some other example herein, wherein the UE is to further map the number of reserved HARQ-ACK resource elements on a symbol that immediately follows symbol(s) that carry a demodulation reference signal.

Example 18 may include the UE, or components thereof, of example 15 and/or some other example herein, wherein the UE is to further: determine an integer, K, based on the number of reserved HARQ-ACK REs and resources allocated for PUSCH transmission; and reserve K symbols for HARQ-ACK.

Example 19 may include the UE, or components thereof, of example 15 and/or some other example herein, wherein the UE is to further: calculate the number of reserved HARQ-ACK resource elements based further on a modulation parameter of an uplink channel and a beta offset.

Example 20 may include the UE, or components thereof, of example 15 and/or some other example herein, wherein the UE is to further: calculate the number of reserved HARQ-ACK resource elements based further on a modulation and coding scheme or spectrum efficiency of an uplink-shared channel and a beta offset or a relative beta offset.

Example 21 may include the UE, or components thereof, of example 15 and/or some other example herein, wherein the UE is to further: determine HARQ-ACK and channel state information (CSI) part 1 are present for transmission on a PUSCH without uplink shared channel data; determine the number of reserved HARQ-ACK resource elements is greater than a number of HARQ-ACK resource elements needed for transmission of the one or more HARQ-ACK bits; and allocate one or more of the number of HARQ-ACK resource elements for transmission of the CSI part 1, wherein the CSI part 1 includes a rank indicator, CSI resource indicator, or a channel quality indicator for a first codeword.

Example 22 may include the UE, or components thereof, of example 15 and/or some other example herein, wherein the UE is to further: determine that uplink control information, which includes HARQ-ACK or channel state information (CSI), is to occupy more than one symbol; determine that a phase tracking-reference signal (PT-RS) is to be transmitted; and fix a time-domain density of the PT-RS to be every symbol regardless of a scheduling modulation and control scheme.

Example 23 may include the UE, or components thereof, of example 15 and/or some other example herein, wherein the UE is to further: determine a number of resource elements reserved for uplink control information, which includes the number of reserved HARQ-ACK resource elements, exceeds a threshold; and determine, based on said determination that the number of resource elements reserved for uplink control information exceeds the threshold, that uplink shared channel data is not to be scheduled.

Example 24 may include the UE, or components thereof, of example 23 and/or some other example herein, wherein the threshold is fixed for slot-based and non-slot-based transmissions or is determined based on a number of resource elements to be used for PUSCH.

Example 25 may include the UE, or components thereof, of example 15 and/or some other example herein, wherein the UE is to further: determine a number of resource elements reserved for uplink control information exceeds a number of resource elements necessary for the uplink control information by one or more resource elements; encode a repetition of channel state information (CSI) part 1 on the one or more resource elements for transmission wherein the CSI part 1 includes a rank indicator, CSI resource indicator, or a channel quality indicator for a first codeword.

Example 26 may include the UE, or components thereof, of example 15 and/or some other example herein, wherein the UE is to further: determine a number of resource elements reserved for uplink control information exceeds a number of resource elements necessary for the uplink control information by one or more resource elements; encode a pseudo-random sequence on the one or more resource elements for transmission, wherein a length of the pseudo-random sequence is determined based on a size of the one or more resource elements, a modulation order for a channel state information (CSI) transmission, or a number of layers for PUSCH transmission.

Example 27 may include the UE, or components thereof, of example 15 and/or some other example herein, wherein the UE is to further: determine a number of resource elements reserved for uplink control information exceeds a number of HARQ-ACK resource elements necessary for the uplink control information by one or more HARQ-ACK resource elements; encode a second instance of a portion of the uplink control information on a first resource element of the one or more resource elements, wherein the first resource element is on a first subcarrier and a first symbol, and a first instance of the portion of the uplink control information is encoded on the first subcarrier and a second symbol that immediately precedes or follows the first symbol.

Example 28 may include a UE, or components thereof, to: calculate a number of reserved hybrid automatic repeat request-acknowledgment (HARQ-ACK) resource elements to be mapped onto a symbol of a physical uplink shared channel (PUSCH); map, based on a mapping rule, the number of reserved HARQ-ACK resource elements onto the symbol, wherein a distance between adjacent resource elements of the number of reserved HARQ-ACK resource elements mapped onto the symbol is one if the number of reserved HARQ-ACK resource elements is equal to or larger than a number of available resource elements in the symbol.

Example 29 may include the UE, or components thereof, of example 28 and/or some other example herein, wherein the distance between adjacent resource elements of the number of reserved HARQ-ACK resource elements mapped onto the symbol is a floor function, based on a ratio of a number of available resource elements in the symbol to a number of remaining reserved HARQ-ACK resource elements to be mapped, if the number of reserved HARQ-ACK resource elements is less than the number of available resource elements in the symbol.

Example 30 may include the UE, or components thereof, of example 28 and/or some other example herein, wherein the UE is to further: identify a scaling factor; and calculate a total number of reserved HARQ-ACK REs, to be mapped on one or more symbols, based on the scaling factor.

Example 31 may include the UE, or components thereof, of example 28 and/or some other example herein, wherein the symbol immediately follows a symbol that carries a demodulation reference signal.

Example 32 may include the UE, or components thereof, of example 28 and/or some other example herein, wherein the UE is to further calculate a total number of reserved HARQ-ACK REs for transmission of HARQ-ACK bits on the PUSCH; determine an integer, K, based on the total number of reserved HARQ-ACK REs and resources allocated for PUSCH; and reserve K symbols for transmission of the HARQ-ACK bits.

Example 33 may include the UE, or components thereof, of example 28 and/or some other example herein, wherein the UE is to further: calculate the number of reserved HARQ-ACK resource elements based further on a modulation and coding scheme or spectrum efficiency of uplink-shared channel and a beta offset or a relative beta offset.

Example 34 may include the UE, or components thereof, of example 28 and/or some other example herein, wherein the UE is to further: identify a fixed HARQ-ACK payload size; and calculate a total number of reserved HARQ-ACK resource elements for transmission of HARQ-ACK bits on the PUSCH based on the fixed HARQ-ACK payload size.

Example 35 may include the UE, or components thereof, of example 34 and/or some other example herein, wherein the UE is to further: calculate the total number of reserved HARQ-ACK resource elements based further on a modulation and coding scheme or spectrum efficiency of an uplink-shared channel and a beta offset or a relative beta offset.

Example 36 may include a UE comprising: memory circuitry to store one or more hybrid automatic repeat request-acknowledgment (HARQ-ACK) bits; processing circuitry coupled with the memory circuitry, the processing circuitry to: identify a fixed HARQ-ACK payload size; calculate, based on the fixed HARQ-ACK payload size, a number of reserved HARQ-ACK resource elements (REs) to carry the one or more HARQ-ACK bits; and encode the one or more HARQ-ACK bits in the number of reserved HARQ-ACK resource elements; and map the number of HARQ-ACK REs onto resources allocated for physical uplink shared channel (PUSCH) transmission.

Example 37 may include the UE of claim 36 and/or some other example herein, wherein the processing circuitry is further to: identify a scaling factor; and calculate the number of reserved HARQ-ACK REs based on the scaling factor.

Example 38 may include the UE of claim 36 and/or some other example herein, wherein the processing circuitry is further to map the number of HARQ-ACK REs onto a symbol that immediately follows first symbol(s) that carry a demodulation reference signal.

Example 39 may include the UE of claim 36 and/or some other example herein, wherein the processing circuitry is further to: determine that uplink control information, which includes HARQ-ACK or channel state information (CSI), is to occupy more than one symbol; determine that a phase tracking-reference signal (PT-RS) is to be transmitted; and fix a time-domain density of the PT-RS to be every symbol regardless of a scheduling modulation and control scheme.

Example 40 may include an apparatus comprising means to perform one or more elements of a method described in or related to any of examples 1-39, or any other method or process described herein.

Example 41 may include one or more non-transitory computer-readable media comprising instructions to cause an electronic device, upon execution of the instructions by one or more processors of the electronic device, to perform one or more elements of a method described in or related to any of examples 1-39, or any other method or process described herein.

Example 42 may include an apparatus comprising logic, modules, or circuitry to perform one or more elements of a method described in or related to any of examples 1-39, or any other method or process described herein.

Example 43 may include a method, technique, or process as described in or related to any of examples 1-39, or portions or parts thereof.

Example 44 may include an apparatus comprising: one or more processors and one or more computer readable media comprising instructions that, when executed by the one or more processors, cause the one or more processors to perform the method, techniques, or process as described in or related to any of examples 1-39, or portions thereof.

Example 45 may include a signal as described in or related to any of examples 1-39, or portions or parts thereof.

Example 46 may include a signal in a wireless network as shown and described herein.

Example 47 may include a method of communicating in a wireless network as shown and described herein.

Example 48 may include a system for providing wireless communication as shown and described herein.

Example 49 may include a device for providing wireless communication as shown and described herein.

What is claimed is:

1. One or more non-transitory, computer-readable media having instructions that, when executed, cause a user equipment (UE) to:
identify a fixed hybrid automatic repeat request-acknowledgement (HARQ-ACK) payload size;
calculate, based on the fixed HARQ-ACK payload size, a number of reserved HARQ-ACK resource elements (REs) to carry one or more HARQ-ACK bits of a HARQ-ACK; and
map the number of reserved HARQ-ACK REs on resources allocated for physical uplink shared channel (PUSCH) transmission.

2. The one or more non-transitory, computer-readable media of claim 1, wherein the instructions, when executed, further cause the UE to:
identify a scaling factor; and
calculate the number of reserved HARQ-ACK REs based on the scaling factor.

3. The one or more non-transitory, computer-readable media of claim 1, wherein the instructions, when executed, further cause the UE to map the number of reserved HARQ-ACK resource elements on a symbol that immediately follows symbol(s) that carry a demodulation reference signal.

4. The one or more non-transitory, computer-readable media of claim 1, wherein the instructions, when executed, further cause the UE to:
determine an integer, K, based on the number of reserved HARQ-ACK REs and resources allocated for the PUSCH transmission; and
reserve K symbols for the HARQ-ACK.

5. The one or more non-transitory, computer-readable media of claim 1, wherein the instructions, when executed, further cause the UE to:
calculate the number of reserved HARQ-ACK resource elements based further on a modulation parameter of an uplink channel and a beta offset.

6. The one or more non-transitory, computer-readable media of claim 1, wherein the instructions, when executed, further cause the UE to:
calculate the number of reserved HARQ-ACK resource elements based further on a modulation and coding scheme or spectrum efficiency of an uplink-shared channel and a beta offset or a relative beta offset.

7. The one or more non-transitory, computer-readable media of claim 1, wherein the instructions, when executed, further cause the UE to:
determine the HARQ-ACK and channel state information (CSI) part 1 are present for the PUSCH transmission without uplink shared channel data; and
determine the number of reserved HARQ-ACK resource elements is greater than a number of HARQ-ACK resource elements needed for transmission of the one or more HARQ-ACK bits; and allocate one or more of the number of reserved HARQ-ACK resource elements for transmission of the CSI part 1,
wherein the CSI part 1 includes a rank indicator, a CSI resource indicator, or a channel quality indicator for a first codeword.

8. The one or more non-transitory, computer-readable media of claim 7, wherein the instructions, when executed, further cause the UE to:
determine that uplink control information, which includes the HARQ-ACK or channel state information (CSI), is to occupy more than one symbol;
determine that a phase tracking-reference signal (PT-RS) is to be transmitted; and
fix a time-domain density of the PT-RS to be every symbol regardless of a scheduling modulation and control scheme.

9. The one or more non-transitory, computer-readable media of claim 8, wherein the instructions, when executed, further cause the UE to:
determine a number of resource elements reserved for the uplink control information, which includes the number of reserved HARQ-ACK resource elements, exceeds a threshold; and
determine, based on said determination that the number of resource elements reserved for uplink control information exceeds the threshold, that uplink shared channel data is not to be scheduled.

10. The one or more non-transitory, computer-readable media of claim 9, wherein the threshold is fixed for slot-based and non-slot-based transmissions or is determined based on a number of resource elements to be used for the PUSCH transmission.

11. The one or more non-transitory, computer-readable media of claim 9, wherein the instructions, when executed, further cause the UE to:
determine the number of resource elements reserved for the uplink control information exceeds a number of resource elements necessary for the uplink control information by one or more resource elements; and
encode a repetition of channel state information (CSI) part 1 on the one or more resource elements for transmission, wherein the CSI part 1 includes the rank indicator, the CSI resource indicator, or the channel quality indicator for the first codeword.

12. The one or more non-transitory, computer-readable media of claim 11, wherein the instructions, when executed, further cause the UE to:
determine the number of resource elements reserved for the uplink control information exceeds the number of resource elements necessary for the uplink control information by one or more resource elements; and
encode a pseudo-random sequence on the one or more resource elements for transmission, wherein a length of the pseudo-random sequence is determined based on a size of the one or more resource elements, a modulation order for a channel state information (CSI) transmission, or a number of layers for the PUSCH transmission.

13. The one or more non-transitory, computer-readable media of claim 11, wherein the instructions, when executed, further cause the UE to:
determine the number of resource elements reserved for the uplink control information exceeds the number of HARQ-ACK resource elements necessary for the uplink control information by one or more HARQ-ACK resource elements; and
encode a second instance of a portion of the uplink control information on a first resource element of the one or more resource elements, wherein the first resource element is on a first subcarrier and a first symbol, and a first instance of the portion of the uplink control information is encoded on the first subcarrier and a second symbol that immediately precedes or follows the first symbol.

14. One or more non-transitory, computer-readable media having instructions that, when executed, cause a user equipment (UE) to:
- calculate a number of reserved hybrid automatic repeat request-acknowledgment (HARQ-ACK) resource elements (REs) to be mapped onto a symbol of a physical uplink shared channel (PUSCH); and
- map, based on a mapping rule, the number of reserved HARQ-ACK resource elements onto the symbol,
- wherein a distance between adjacent resource elements of the number of reserved HARQ-ACK resource elements mapped onto the symbol is one if the number of reserved HARQ-ACK resource elements is equal to or larger than a number of available resource elements in the symbol.

15. The one or more non-transitory, computer-readable media of claim 14, wherein the distance between adjacent resource elements of the number of reserved HARQ-ACK resource elements mapped onto the symbol is a floor function, based on a ratio of a number of available resource elements in the symbol to a number of remaining reserved HARQ-ACK resource elements to be mapped, if the number of reserved HARQ-ACK resource elements is less than the number of available resource elements in the symbol.

16. The one or more non-transitory, computer-readable media of claim 14, wherein the instructions, when executed, further cause the UE to:
- identify a scaling factor; and
- calculate a total number of reserved HARQ-ACK REs, to be mapped on one or more symbols, based on the scaling factor.

17. The one or more non-transitory, computer-readable media of claim 14, wherein the symbol immediately follows a symbol that carries a demodulation reference signal.

18. The one or more non-transitory, computer-readable media of claim 14, wherein the instructions, when executed, further cause the UE to:
- calculate a total number of reserved HARQ-ACK REs for transmission of HARQ-ACK bits on the PUSCH;
- determine an integer, K, based on the total number of reserved HARQ-ACK REs and resources allocated for the PUSCH; and
- reserve K symbols for the transmission of the HARQ-ACK bits.

19. The one or more non-transitory, computer-readable media of claim 14, wherein the instructions, when executed, further cause the UE to:
- calculate the number of reserved HARQ-ACK resource elements based further on a modulation and coding scheme or spectrum efficiency of uplink-shared channel and a beta offset or a relative beta offset.

20. The one or more non-transitory, computer-readable media of claim 14, wherein the instructions, when executed, further cause the UE to:
- identify a fixed HARQ-ACK payload size; and
- calculate a total number of reserved HARQ-ACK resource elements for transmission of HARQ-ACK bits on the PUSCH based on the fixed HARQ-ACK payload size.

21. The one or more non-transitory, computer-readable media of claim 20, wherein the instructions, when executed, further cause the UE to:
- calculate the total number of reserved HARQ-ACK resource elements based further on a modulation and coding scheme or spectrum efficiency of an uplink-shared channel and a beta offset or a relative beta offset.

22. An apparatus comprising:
- memory circuitry to store one or more hybrid automatic repeat request-acknowledgment (HARQ-ACK) bits;
- processing circuitry coupled with the memory circuitry, the processing circuitry to:
  - identify a fixed HARQ-ACK payload size;
  - calculate, based on the fixed HARQ-ACK payload size, a number of reserved HARQ-ACK resource elements (REs) to carry the one or more HARQ-ACK bits;
  - encode the one or more HARQ-ACK bits in the number of reserved HARQ-ACK resource elements; and
  - map the number of HARQ-ACK REs onto resources allocated for physical uplink shared channel (PUSCH) transmission.

23. The apparatus of claim 22, wherein the processing circuitry is further to:
- identify a scaling factor; and
- calculate the number of reserved HARQ-ACK REs based on the scaling factor.

24. The apparatus of claim 22, wherein the processing circuitry is further to map the number of HARQ-ACK REs onto a symbol that immediately follows first symbol(s) that carry a demodulation reference signal.

25. The apparatus of claim 22, wherein the processing circuitry is further to:
- determine that uplink control information, which includes a HARQ-ACK or channel state information (CSI), is to occupy more than one symbol;
- determine that a phase tracking-reference signal (PT-RS) is to be transmitted; and
- fix a time-domain density of the PT-RS to be every symbol regardless of a scheduling modulation and control scheme.

* * * * *